(12) United States Patent
Ichikawa

(10) Patent No.: US 10,981,733 B2
(45) Date of Patent: Apr. 20, 2021

(54) PRODUCT SORTING APPARATUS

(71) Applicant: AMADA CO., LTD., Kanagawa (JP)

(72) Inventor: Takahiro Ichikawa, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 16/761,347

(22) PCT Filed: Nov. 8, 2018

(86) PCT No.: PCT/JP2018/041441
§ 371 (c)(1),
(2) Date: May 4, 2020

(87) PCT Pub. No.: WO2019/093409
PCT Pub. Date: May 16, 2019

(65) Prior Publication Data
US 2020/0377313 A1 Dec. 3, 2020

(30) Foreign Application Priority Data
Nov. 9, 2017 (JP) .............................. JP2017-216140

(51) Int. Cl.
*B07C 3/02* (2006.01)
*B65G 47/91* (2006.01)
*B65G 47/46* (2006.01)

(52) U.S. Cl.
CPC ................ *B65G 47/91* (2013.01); *B07C 3/02* (2013.01); *B65G 47/46* (2013.01)

(58) Field of Classification Search
CPC ..... B07C 5/36; B07C 5/38; B07C 2501/0063; B65G 1/026; B65G 1/12; B65G 47/46;
(Continued)

(56) References Cited

U.S. PATENT DOCUMENTS

| 4,850,783 A | * | 7/1989 | Maekawa | ............ | B65G 1/1378 |
| | | | | | 414/792.9 |
| 5,141,118 A | * | 8/1992 | Gay | ....................... | B65G 1/026 |
| | | | | | 211/151 |

(Continued)

FOREIGN PATENT DOCUMENTS

| JP | 4-135507 U | 12/1992 |
| JP | 11-310324 A | 11/1999 |
| JP | 2008-30057 A | 2/2008 |

OTHER PUBLICATIONS

Written Opinion issued in International Bureau of WIPO Patent Application No. PCT/JP2018/041441, dated Feb. 12, 2019.
(Continued)

*Primary Examiner* — Joseph C Rodriguez
(74) *Attorney, Agent, or Firm* — Greenblum & Berstein, P.L.C.

(57) ABSTRACT

A product sorting apparatus includes a pallet station supporting a pallet on which a product is placed and moves up and down between a base position and a raised position, a transfer device transferring the product to a first area that is on a first side of the pallet station, a first cart movable between the first area and a second area that is on a second side of the pallet station, and a second cart movable between the first area and the second area and able to pass through the inside of the first cart. Through the inside of the pallet station set at the base position, the first cart is unable to pass and the second cart is able to pass, and through the inside of the pallet station set at the raised position, both the first and second carts are able to pass.

5 Claims, 20 Drawing Sheets

(58) Field of Classification Search
CPC ... B65G 47/91; B25J 5/04; B25J 9/026; B25J 15/06; B62B 3/16; B62B 3/165; B62B 3/18; B62B 3/184; B62B 3/188
USPC .................. 414/277, 279, 286; 198/345.3
See application file for complete search history.

(56) References Cited

U.S. PATENT DOCUMENTS

| | | | | |
|---|---|---|---|---|
| 5,941,673 | A * | 8/1999 | Hayakawa | B23Q 7/103 414/225.01 |
| 6,606,531 | B1 * | 8/2003 | Leibinger | B65H 1/00 156/364 |
| 6,851,562 | B2 * | 2/2005 | Gorniak | B65G 1/026 211/151 |
| 7,141,758 | B2 * | 11/2006 | Zeygerman | B23K 26/0884 219/121.67 |
| 7,210,675 | B2 * | 5/2007 | Montague | B23Q 7/1431 269/20 |
| 8,826,787 | B2 * | 9/2014 | Hoover | B65H 3/0883 83/100 |
| 2008/0023900 | A1 | 1/2008 | Sohka et al. | |
| 2010/0023159 | A1 | 1/2010 | Mueller | |
| 2020/0094431 | A1 * | 3/2020 | Forlong | B26F 1/3813 |

OTHER PUBLICATIONS

Decision to Grant a Patent issued in Japan Patent Application No. 2017-216140, dated Feb. 8, 2019, along with an English translation thereof.
International Search Report issued in International Bureau of WIPO Patent Application No. PCT/JP2018/041441, dated Feb. 12, 2019, along with an English translation thereof.

* cited by examiner

PRODUCT SORTING APPARATUS

TECHNICAL FIELD

The present invention relates to a product sorting apparatus, and particularly, to a product sorting apparatus for sorting and transferring products placed on a pallet to a plurality of collecting pallets.

BACKGROUND ART

There is known a product sorting apparatus for sorting and transferring products placed on a pallet or the like to a plurality of collecting pallets.

For example, Japanese Unexamined Patent Application Publication No. H11-310324 (Patent Literature 1) discloses a product sorting and collecting apparatus for sucking, with a suction unit, products taken out of a processing machine and placed on a table and sorting and transferring the products to respective collecting pallets of adjacently arranged first and second collecting stations.

SUMMARY OF INVENTION

Problems to be Solved by Invention

The apparatus disclosed in the Patent Literature 1 arranges the plurality of collecting stations in parallel with each other on a plane, and therefore, needs a wide installation space. Also, each of the collecting stations needs a carrying-out work space for carrying sorted products out of the collecting station. Accordingly, there is a requirement for reducing the apparatus installation space and product carrying-out work space.

In addition, the carrying-out work space must be secured at a location adjacent to the collecting station, and therefore, is sometimes compelled to be secured on the back side of the apparatus instead of the front side thereof. This makes it difficult to secure moving paths for workers and forklifts. In view of a carrying-out work convenience, improvements are desired.

Means to Solve Problems

According to the present invention, there can be provided a product sorting apparatus capable of saving an installation space and a carrying-out work space and improving a carrying-out work convenience.

According to a technical aspect of the present invention, the product sorting apparatus is characterized by including a pallet station that supports a pallet on which a product is placed and moves up and down between a base position and a raised position higher than the base position, a transfer device that is able to transfer the product, which is placed on the pallet supported by the pallet station, to a first area that is on a first side of the pallet station, a first cart being movable between the first area and a second area, and a second cart being movable between the first area and the second area and is able to pass through the inside of the first cart, wherein, through the inside of the pallet station set at the base position, the first cart is unable to pass and the second cart is able to pass, and through the inside of the pallet station set at the raised position, both the first and second carts are able to pass.

MODE OF IMPLEMENTING INVENTION

Sorting apparatuses according to implementing modes of the present invention will be explained with reference to the sorting apparatuses 51 and 151 of the Embodiments 1 and 2.

Embodiment 1

Figure 1:
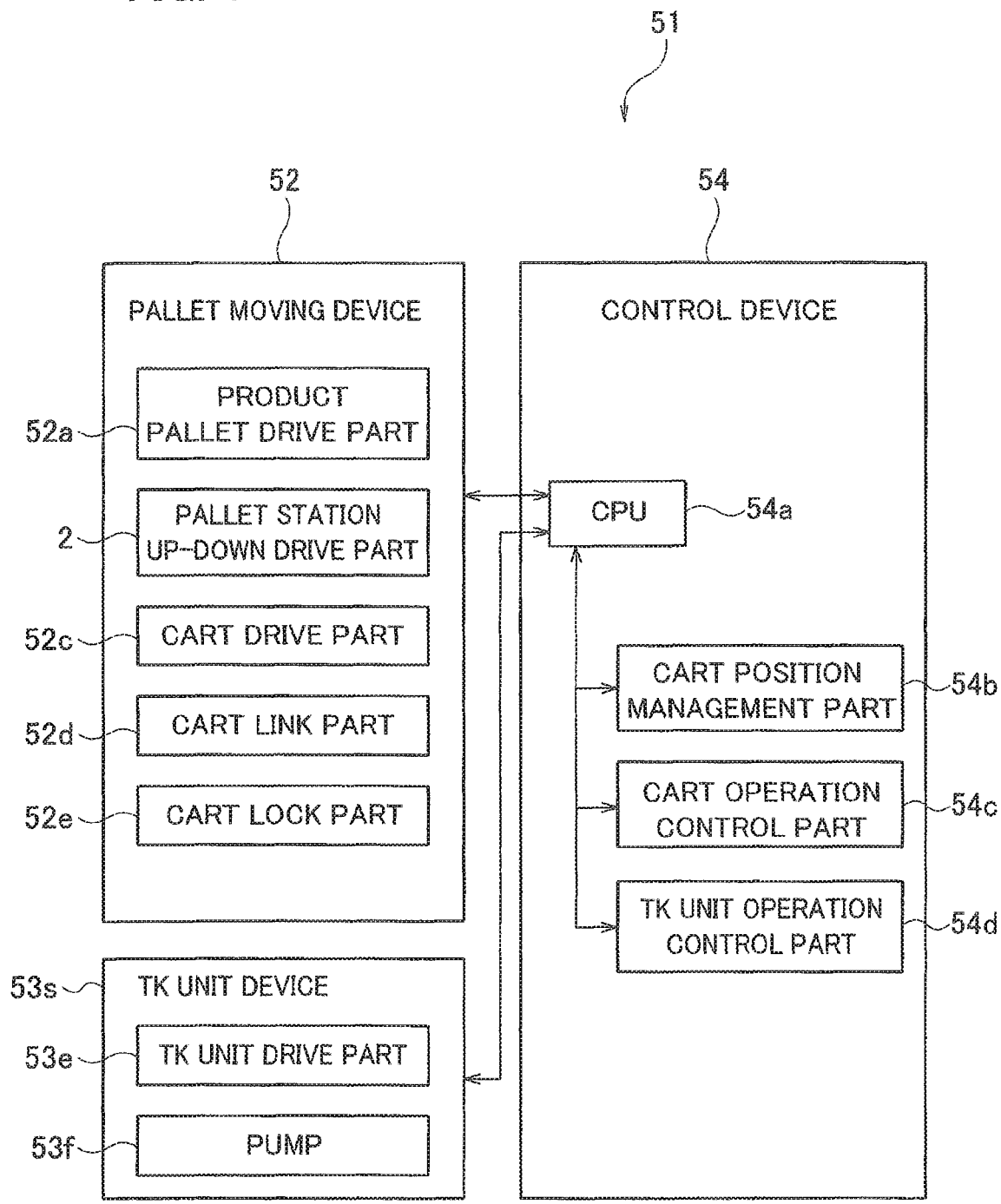
FIG. 1 is a block diagram illustrating a configuration of a product sorting apparatus 51 that is Embodiment 1 of a sorting apparatus according to an implementing mode of the present invention.
Figure 2:
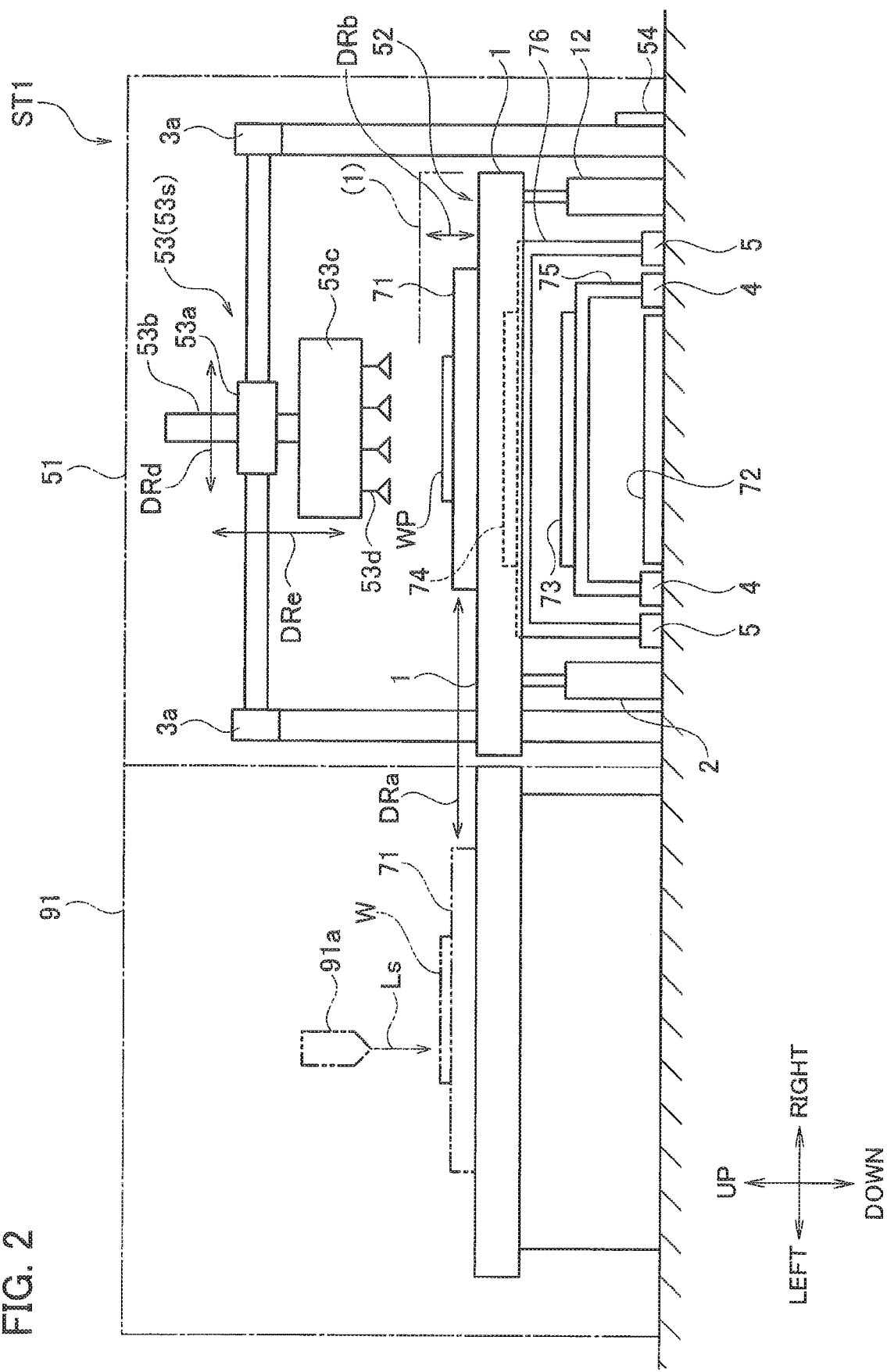
FIG. 2 is a front view illustrating a processing system ST1 including the sorting apparatus 51.
Figure 3:
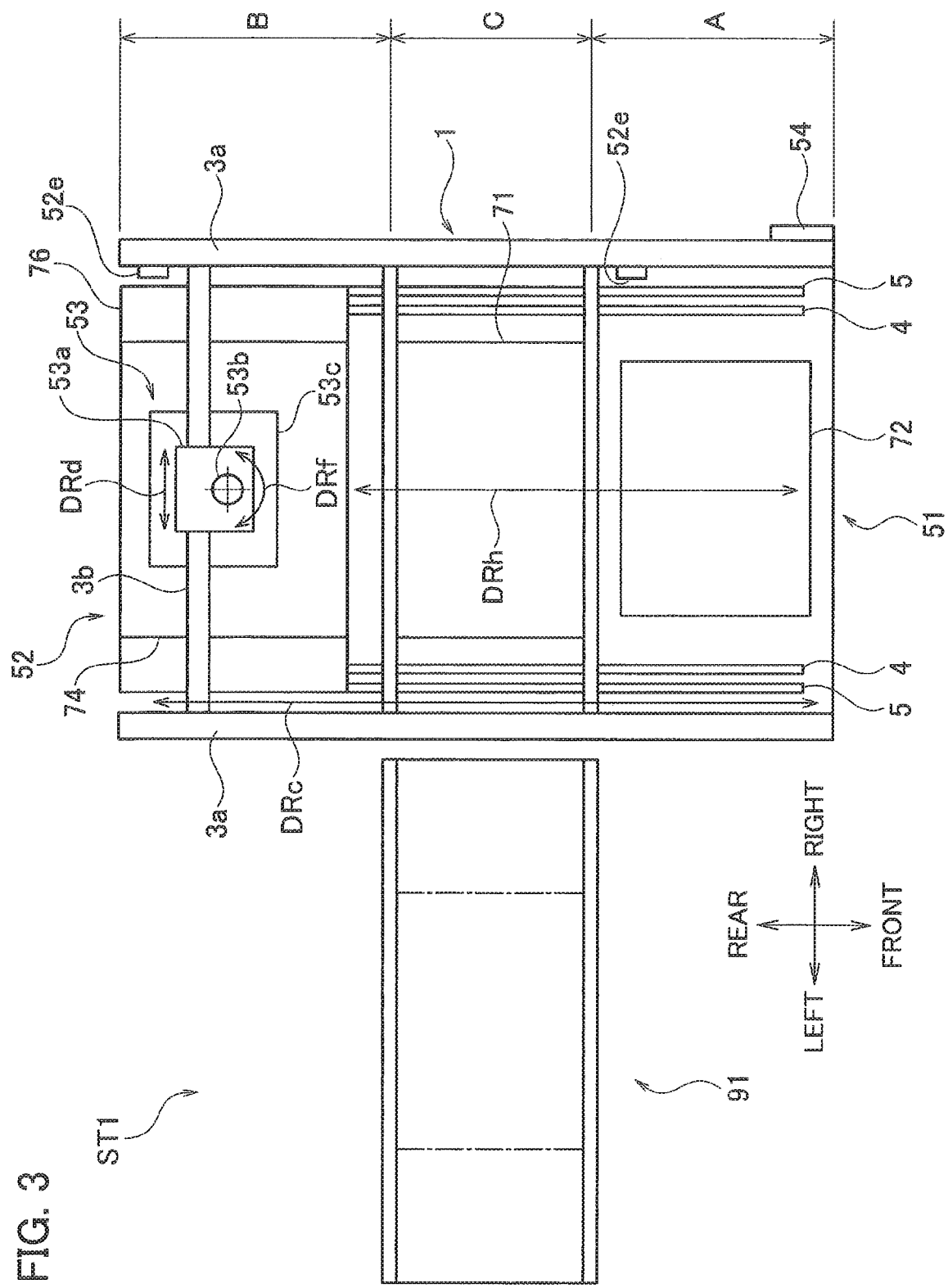
FIG. 3 is a top view of the processing system ST1.
Figure 4:
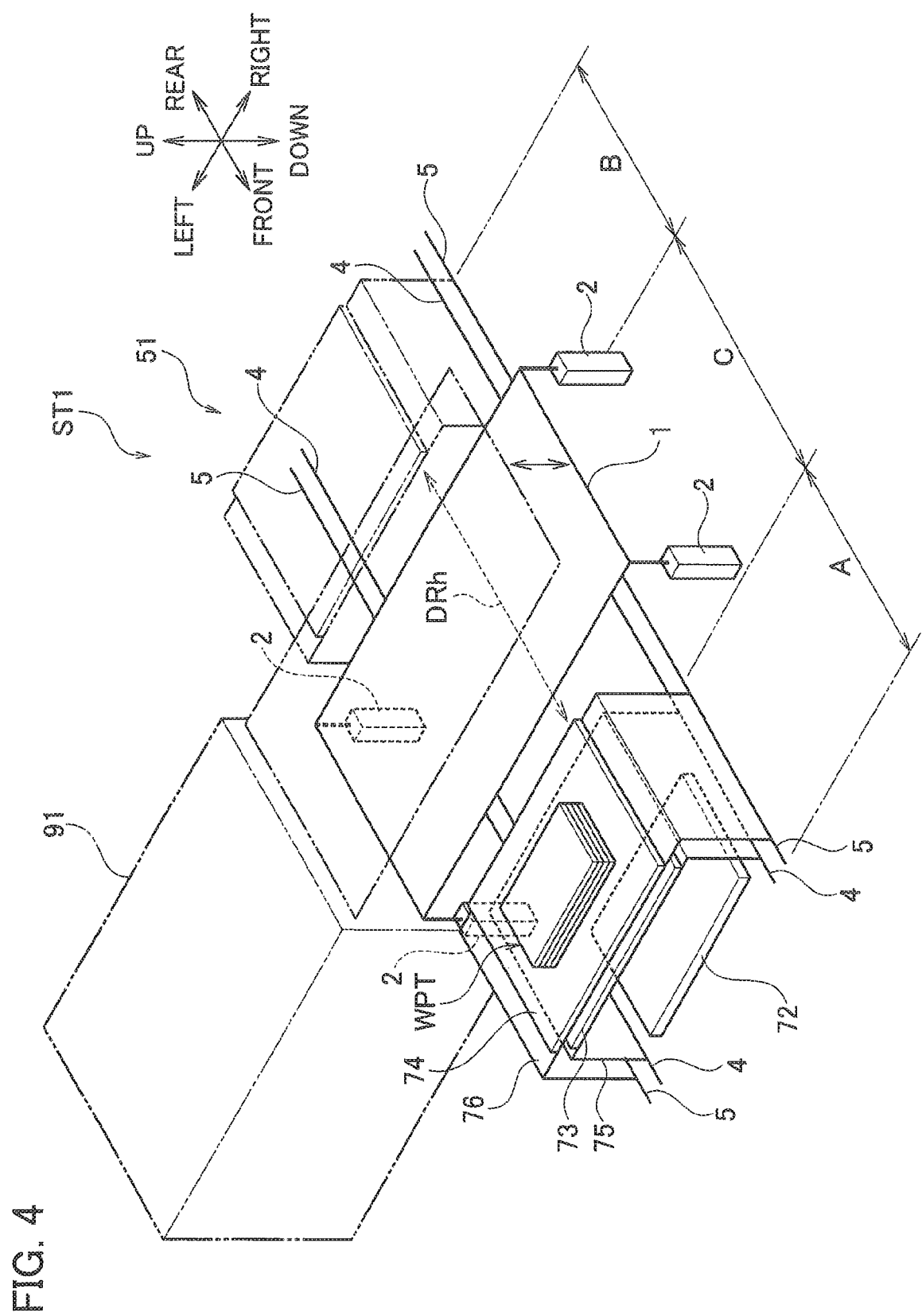
FIG. 4 is a perspective view of the processing system ST1.

First, a configuration of the sorting apparatus 51 of the Embodiment 1 will be explained with reference to FIGS. 1 to 4. FIG. 1 is a block diagram illustrating the configuration of the sorting apparatus 51. FIG. 2 is a front view illustrating a processing system ST1 including the sorting apparatus 51 and a laser processing machine 91. Hereunder, for convenience of explanation, up, down, left, and right directions are defined as indicated with arrows in FIG. 1. Front and rear directions correspond to the front and reverse sides of a plane of FIG. 2. FIG. 3 is a top view illustrating the processing system ST1 and FIG. 4 is a schematic perspective view illustrating the processing system ST1 seen from an oblique front right upper direction in which some members are not illustrated to avoid complication of the drawing.

The processing system ST1 is configured to have, as illustrated in FIG. 2, the sorting apparatus 51 and laser processing machine 91. The laser processing machine 91 is to emit a laser beam Ls from a laser processing head 91a and cut a product WP out of a plate material W, i.e., a raw material placed on a product pallet 71.

The sorting apparatus 51 has a pallet station 1 and is arranged in parallel with and on the right side of the laser processing machine 91. The sorting apparatus 51 is configured to have a pallet moving device 52, a takeout loader unit device (hereunder, a TK unit device) 53s, and a control device 54.

The control device 54 may be an external computer, but here, it is provided for the sorting apparatus 51. The control device 54 is configured to include, as illustrated in FIG. 1, a central processing unit (CPU) 54a, a cart position management part 54b, a cart operation control part 54c, and a TK unit operation control part 54d.

In FIGS. 2 to 4, the pallet moving device 52 has the pallet station 1, which is movable up and down and is provided with rails (not illustrated) to movably support the product pallet 71 in a left-right direction, and a product pallet drive part 52a (refer to FIG. 1) to move the product pallet 71 leftward and rightward.

The rails substantially connect, when the pallet station 1 is at a descended base position, the pallet station 1 and the laser processing machine 91 to each other, to enable the product pallet 71 to reciprocate between the pallet station 1 and the laser processing machine 91.

The pallet station 1 is supported with, at four corners, pallet station up-down drive parts 2 that are up-down support posts each having an up-down function provided by an air cylinder or the like to move the pallet station 1 up and down (an arrow DRb) between the descended base position indicated with a continuous line in FIG. 2 and a raised position partly illustrated with a chain line.

The sorting apparatus 51 has guide rails 3a that are at a position higher than the pallet station 1, are extended in a front-rear direction, and are supported with a plurality of supports and the like such that they are in parallel with each other and form a left-and-right pair. Between the pair of guide rails 3a, a frame 3b is stretched to move in a front-rear direction (an arrow DRc in FIG. 3).

A front-rear movable range of the frame 3b is nearly between front and rear ends of the sorting apparatus 51. More precisely, as illustrated in FIG. 3, it is a range including a center area C corresponding to the pallet station 1, a front area A on the front side of the center area C, and a rear area B on the rear side of the center area C.

The TK unit device 53s is a transfer device for transferring the product WP and has a TK unit 53, a TK unit drive part 53e, and a pump 53f (refer to FIG. 1) for generating a negative pressure. The frame 3b left-right movably supports the TK unit 53 (an arrow DRd in FIGS. 2 and 3). A left-right movable range of the TK unit 53 at least includes a whole left-right range of the product pallet 71 supported on the pallet station 1.

The TK unit 53 has a connection part 53a connected to the frame 3b, a base support 53b supported to move up and down (an arrow DRe in FIG. 2) relative to the connection part 53a, and a suction part 53c arranged at a lower part of the base support 53b. The connection part 53a supports the base support 53b such that the base support 53b including the suction part 53c is rotatable (an arrow DRf in FIG. 3) around a vertical axis. At a lower part of the suction part 53c, there are arranged a plurality of suction units 53d provided with suction cups to suck a plate material.

Movements of the TK unit 53 in the front-rear, left-right, and up-down directions are executed by the TK unit drive part 53e under the control of the TK unit operation control part 54d in the control device 54. Air suction by the suction units 53d is achieved by the negative pressure generated by the pump 53f.

With the above-mentioned configurations, the TK unit 53 sucks, for example, the product WP, which has been processed by the laser processing machine 91 and transferred on the product pallet 71 to the pallet station 1, and transfers and places the product WP to and at an optional position in the front area A or rear area B.

The pallet moving apparatus 52 has, in the front area A and rear area B, a plurality of pallets each for supporting a product collection WPT that is a collection of products WP transferred from the product pallet 71 by the TK unit 53. A height of the product collection WPT is controlled to be within a predetermined upper limit height.

Next, the plurality of collecting pallets will be explained. The number of the plurality of collecting pallets in this example is three.

A first one is a floor pallet 72 that is arranged as a lower stage on the floor of the front area A. The remaining two are a middle pallet 73 and an upper pallet 74.

The floor pallet 72, middle pallet 73, and upper pallet 74 each have, to enable movements by forklift, a fork pocket (not illustrated) to receive a fork from a front side. The middle pallet 73 and upper pallet 74 are set on the top faces of a middle cart 75 and an upper cart 76 that are movable back and forth with the use of wheels 75a and 76a on rails arranged on the left and right of the floor pallet 72.

The rails are four as illustrated in FIGS. 2 to 4 and are extended in the front-rear direction on the left and right outer sides of the floor pallet 72.

More precisely, a pair close to the floor pallet 72 are the rails 4 supporting the middle cart 75 and a pair outside the rails 4 are the rails 5 supporting the upper cart.

The middle cart 75 and upper cart 76 are formed such that left-right widths and up-down heights overlap outside and inside. Namely, the middle cart 75 with the middle pallet 73, even with the product collection WPT of the predetermined upper limit height placed thereon, is able to move back and forth on the rails 4 and pass under the upper cart 76 without interference.

Figure 5:
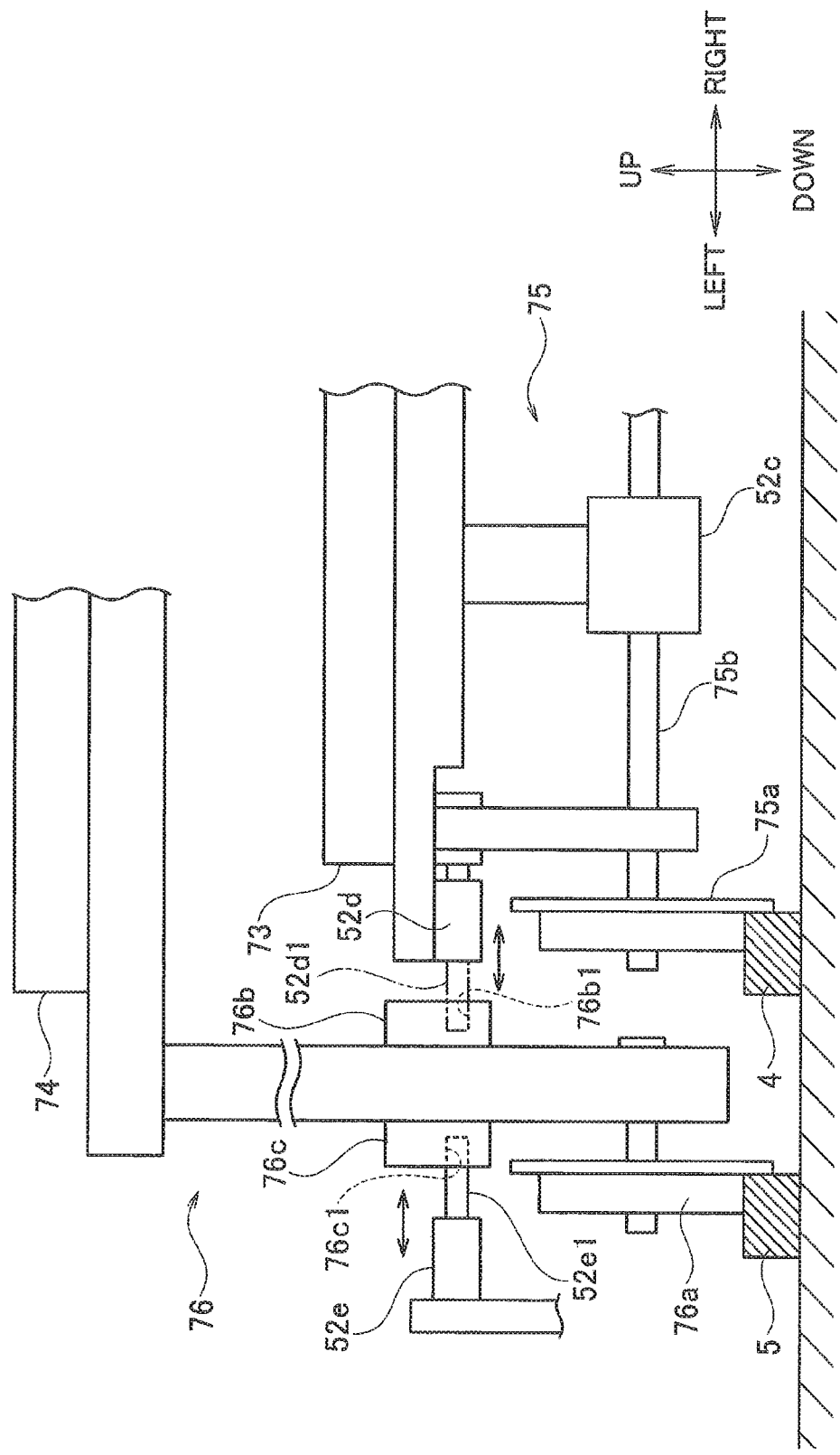
FIG. 5 is a partial front view explaining a driving and connecting configuration of a pallet moving device 52 provided for the sorting apparatus 51.

FIG. 5 is a partial front view explaining a structure around the wheels 75a and 76a of the middle cart 75 and upper cart 76.

The middle cart 75 is provided with, as a cart drive part 52c, a motor for rotatively driving a wheel shaft 75b. With this, under the control of the cart operation control part 54c of the control device 54, the middle cart 75 is self-movable back and forth with the middle pallet 73 placed thereon.

Also, the middle cart 75 is provided with a cart link part 52d that reciprocates a bar-like connection pin 52d1 to protrude leftward in FIG. 5 by operation of an air cylinder or the like. In FIG. 5, a disconnected state of the middle cart 75 and upper cart 76 is depicted with a continuous line and the connection pin 52d1 at a position protruded leftward to set a connected state is depicted with a broken line.

The upper cart 76 is not self-movable and is movable on the rails 5 by the rotation of the wheels 76a. As illustrated in FIG. 5, the upper cart 76 is provided with a pin engagement part 76b having an engagement hole 76b1 into which the connection pin 52d1 of the middle cart 75 is insertable.

When the middle cart 75 overlaps the upper cart 76 at the same front-rear-direction position, the connection pin 52d1 can be protruded by the operation of the cart link part 52d of the middle cart 75 and can be inserted in the engagement hole 76b1. When the connection pin 52d1 is inserted in the engagement hole 76b1, the middle cart 75 and upper cart 76 are prohibited from moving relative to each other in the front-rear direction and are together moved back and forth.

Operation of the in-and-out movements of the connection pin 52d1 of the cart link part 52d is controlled by the cart operation control part 54c. Namely, the cart link part 52d selectively executes connection and disconnection between the middle cart 75 and the upper cart 76 under the control of the cart operation control part 54c.

As illustrated in FIG. 5, the upper cart 76 is provided with a lock pin engagement part 76c having an engagement hole 76c1 whose opening is outwardly oriented.

On the other hand, the pallet moving device 52 is provided with a cart lock part 52e in each of the front area A and rear area B (refer to FIG. 3, too) so that, when the upper cart 76 is at a predetermined position in the front area A or the rear area B, a lock pin 52e1 is protruded to be inserted in and engaged with the engagement hole 76c1 of the lock pin engagement part 76c.

When the lock pin 52e1 is inserted in the engagement hole 76c1, the upper cart 76 is prohibited from moving back and forth so that the upper cart 76 is unable to freely move at the front-rear-direction position set in the front area A or the rear area B. In FIG. 5, the lock pin 52e1 is protruded rightward and inserted in the engagement hole 76c1 to establish a locked state.

Here, the pallet station 1 at the base position is configured to interfere in a height direction with one of the upper cart 76, the upper pallet 74 placed on the upper cart 76, and the product collection WPT (including the products WP) placed on the upper pallet 74.

This is because a height position of the product pallet 71 placed on the pallet station 1 is at a position corresponding to a so-called pass line of the laser processing machine 91. Also because, in connection with that, a height position of the upper pallet 74 on the upper cart 76, which is a third stage from below, is determined according to a generally preferred upper limit height of the product collection WPT (refer to FIG. 4) to be collected on a single pallet and is set at a position close to the height of the pallet station 1.

Namely, when the pallet station 1 is at the base position, the middle cart 75 and the middle pallet 73 placed thereon are able to move back and forth under the pallet station 1. However, at least one of the upper cart 76 and the upper pallet 74 placed thereon hits the pallet station and is unable to pass under the same.

To cope with this, the pallet station 1 is movable up and down by the pallet station up-down drive part 2 for a stroke to avoid an interference with any one of the upper cart 76, the upper pallet 74 placed on the upper cart 76, and the product collection WPT (including the products WP) placed on the upper pallet 74. With this, the upper cart 76 and upper pallet 74 are able to pass under the pallet station 1 at the raised position and move between the front area A and the rear area B (an arrow DRh in FIGS. 3 and 4).

As already mentioned, the product WP on the product pallet 71 is transferrable by the TK unit 53 to any one of the front area A and rear area B. And, the pallet moving device 52 is provided with the floor pallet 72 that is arranged in the front area A, the middle cart 75 that is movable, when the pallet station 1 is at any one of the base position and raised position, between the front area A and the rear area B, and the upper cart 76 that is movable, only when the pallet station 1 is at the raised position, between the front area A and the rear area B.

Figure 6:
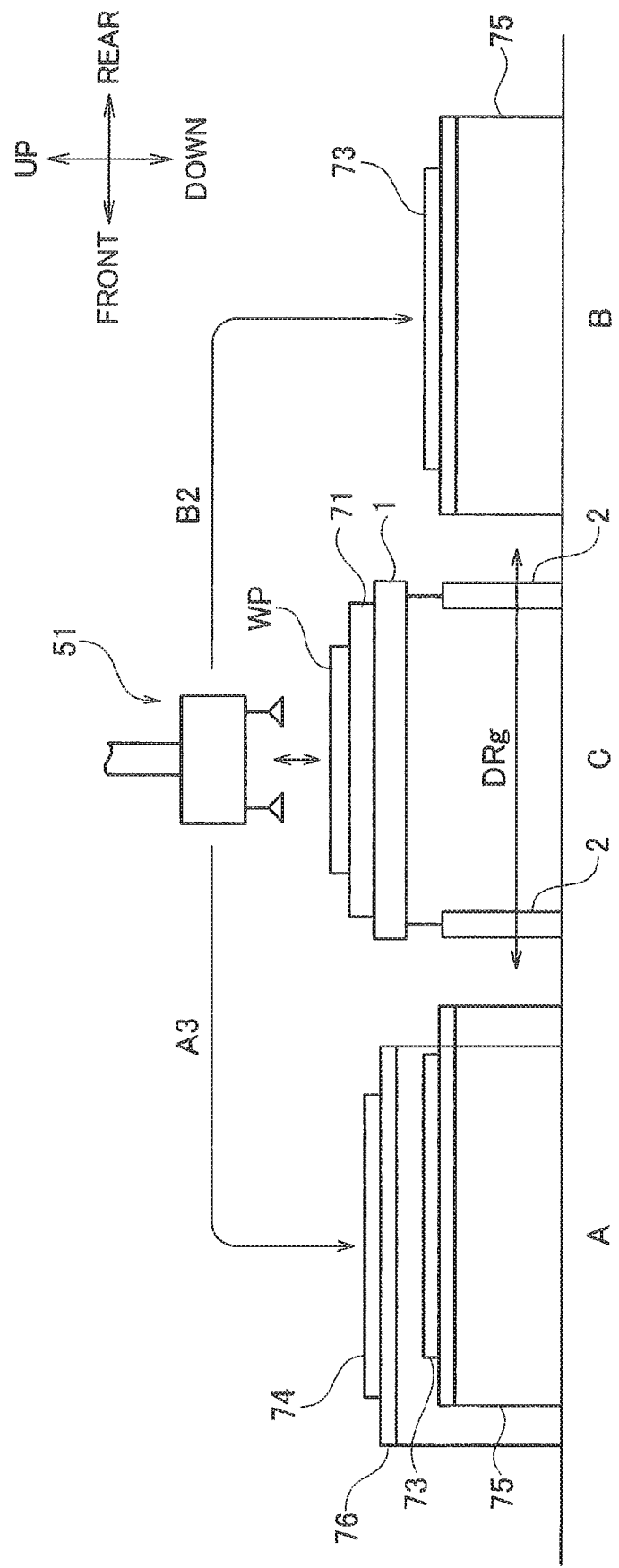
FIG. 6 is a schematic view explaining product transfer paths when a pallet station 1 of the sorting apparatus 51 is at a base position.

With this, for example, as illustrated in the schematic view of FIG. 6, when the upper cart 76 and middle cart 75 are in the front area A and the pallet station 1 is at the base position, the product WP placed on the product pallet 71 on the pallet station 1 is transferrable by the TK unit 53 through a transfer path A3 to the upper pallet 74 of the upper cart 76 in the front area A.

Also, by moving the middle cart 75 to the rear area B (an arrow DRg), the product WP placed on the product pallet 71 on the pallet station 1 is transferrable through a transfer path B2 to the middle pallet 73 of the middle cart 75.

Figure 7:
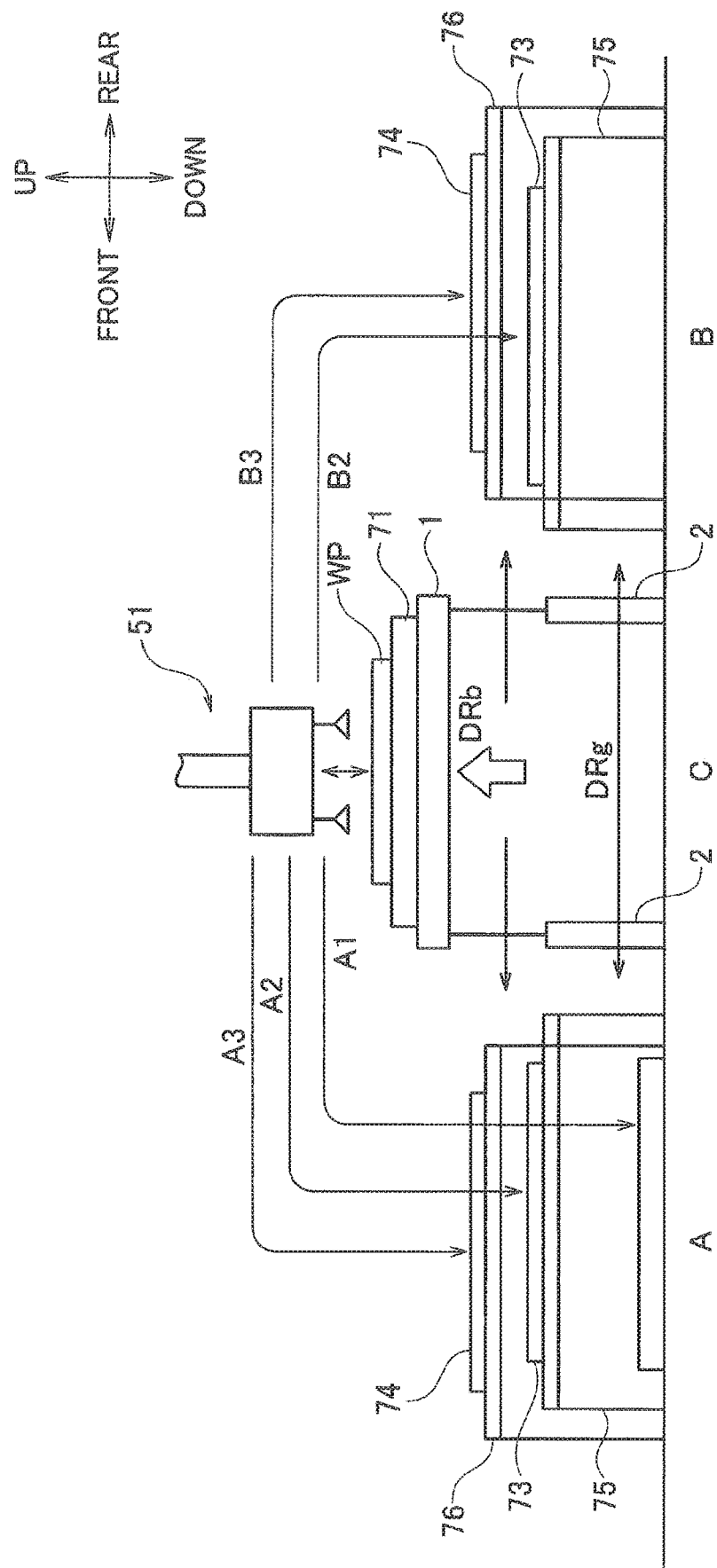
FIG. 7 is a schematic view explaining product transfer paths when the pallet station 1 is at a raised position.

Also, for example, as illustrated in the schematic view of FIG. 7, when the pallet station 1 is at the raised position, the product WP placed on the product pallet 71 on the pallet station 1 is transferrable by the TK unit 53 through transfer paths A3 and B3 to the upper pallet 74 of the upper cart 76 which is in any one of the front area A and rear area B.

Also, the product WP placed on the product pallet 71 on the pallet station 1 is transferrable through transfer paths A2 and B2 to the middle pallet 73 of the middle cart 75 which is in any one of the front area A and rear area B.

Further, moving the middle cart 75 and upper cart 76 to the rear area B results in opening the top of the floor pallet 72, and therefore, the product WP placed on the product pallet 71 on the pallet station 1 is transferrable thereto through a transfer path A1.

As is apparent from these operations, the sorting apparatus 51 is able to transfer the product WP to, when the TK unit 53 is able to transfer the product WP from the product pallet 71 to the two areas (front area A and rear area B), the three pallets (floor pallet 72, middle pallet 73, and upper pallet 74) the number of which is greater than the number of the transferrable areas (two).

From any one of the tree pallets on which the products WP are placed, a worker or a robot is able to carry the products WP to the outside in a single area (the front area A).

Concrete examples of sorting and transferring products WP placed on the product pallet 71 to the three pallets (floor pallet 72, middle pallet 73, and upper pallet 74) will be explained with reference to the schematic operational views of FIGS. 8 to 15 that illustrate only the pallets.

In each of the drawings, the products WP to be sorted are three kinds including a product WP2 (illustrated as a square) to be sorted to the floor pallet 72, a product WP3 (illustrated as a circle) to be sorted to the middle pallet 73, and a product WP4 (illustrated as a triangle) to be sorted to the upper pallet 74.

Also, to avoid drawing complication, only the product pallet 71, floor pallet 72, middle pallet 73, and upper pallet 74 are illustrated and the other members (middle cart 75, upper cart 76, pallet station 1, TK unit 53, and the like) are not illustrated. The operation of each drive device is controlled by the control device 54.

Figure 8:
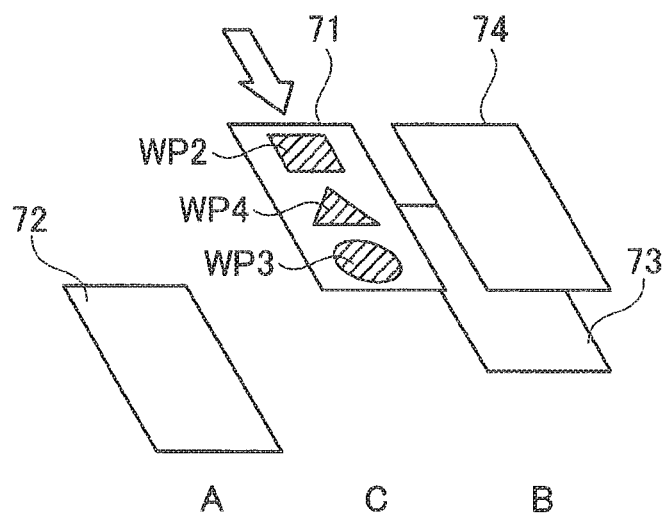
FIG. 8 is a first schematic view explaining the operation of the pallet moving device 52.

FIG. 8 illustrates an operation initial state of the pallet moving device 52. Namely, this is a state that the middle pallet 73 and upper pallet 74 are positioned in the rear area B and the product pallet 71 is on the pallet station 1 positioned at the base position. Also, the floor pallet 72 is in a state that no pallet is present above the same.

Figure 9:
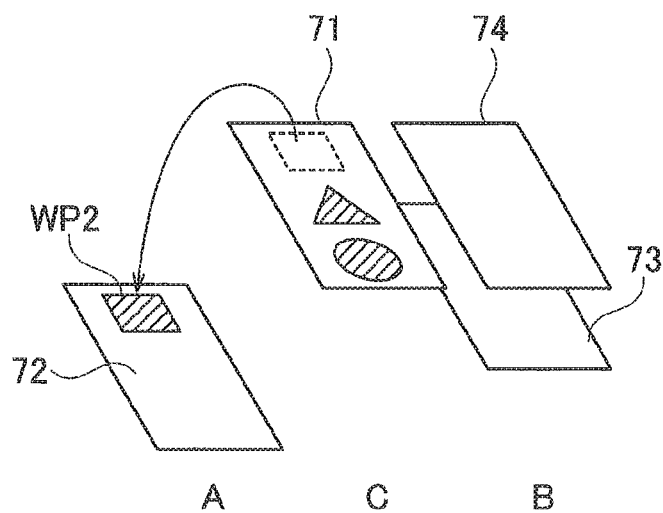
FIG. 9 is a second schematic view explaining the operation of the pallet moving device 52.

First, the product pallet 71 on which the products WP1 to WP3 cut by the laser processing machine 91 are placed is conveyed to the center area C of the pallet moving device 52 (a white arrow). In FIG. 9, the TK unit 53 (not illustrated) transfers the product WP2 on the product pallet 71 to the floor pallet 72.

Figure 10:
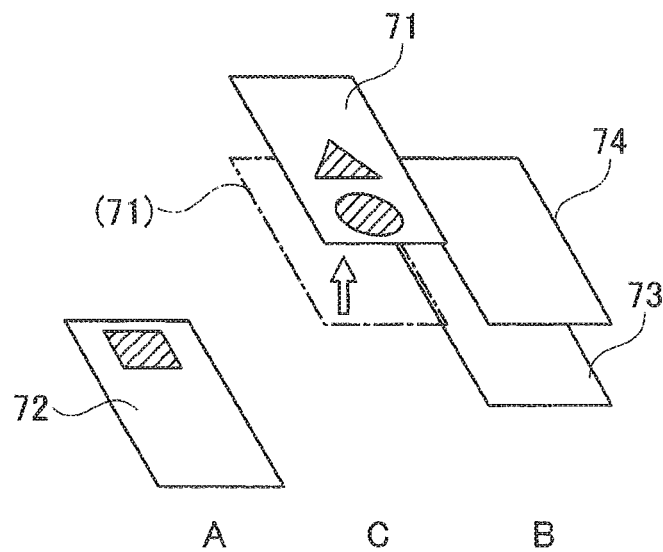
FIG. 10 is a third schematic view explaining the operation of the pallet moving device 52.

As illustrated in FIG. 10, the pallet station 1 is lifted together with the product pallet 71 by the pallet station up-down drive part 2 (FIG. 2 and others) to the raised position (a white arrow), so that the upper cart 76 and upper pallet 74 ca pass to the front area A.

Figure 11:
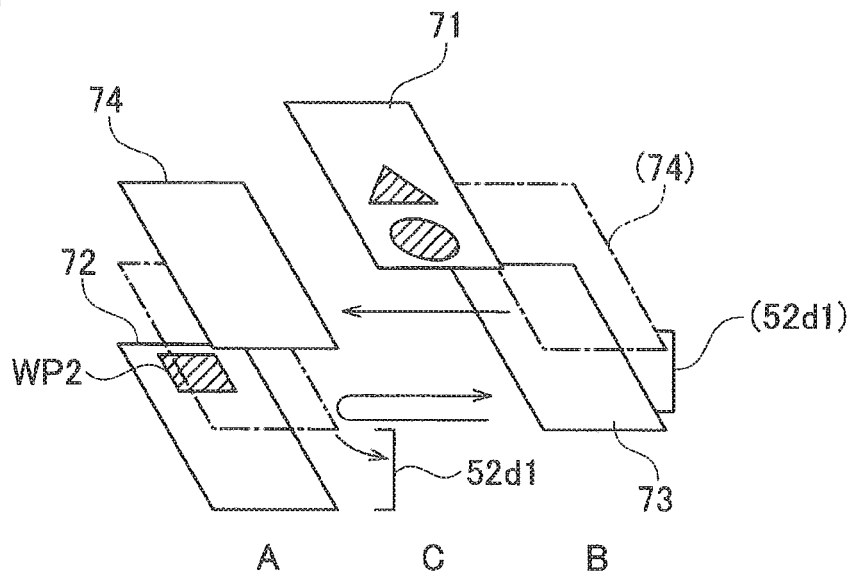
FIG. 11 is a fourth schematic view explaining the operation of the pallet moving device 52.

In FIG. 11, when the product pallet 71 (and the pallet station 1) reaches the raised position, the cart link part 52d (FIG. 1) is activated to connect the middle cart 75 and upper cart 76 with each other with the connection pin 52d1 and the cart drive part 52c is activated to move them to the front area A. Thereafter, the connection is released and only the middle pallet 73 is returned to the rear area B.

Figure 12:
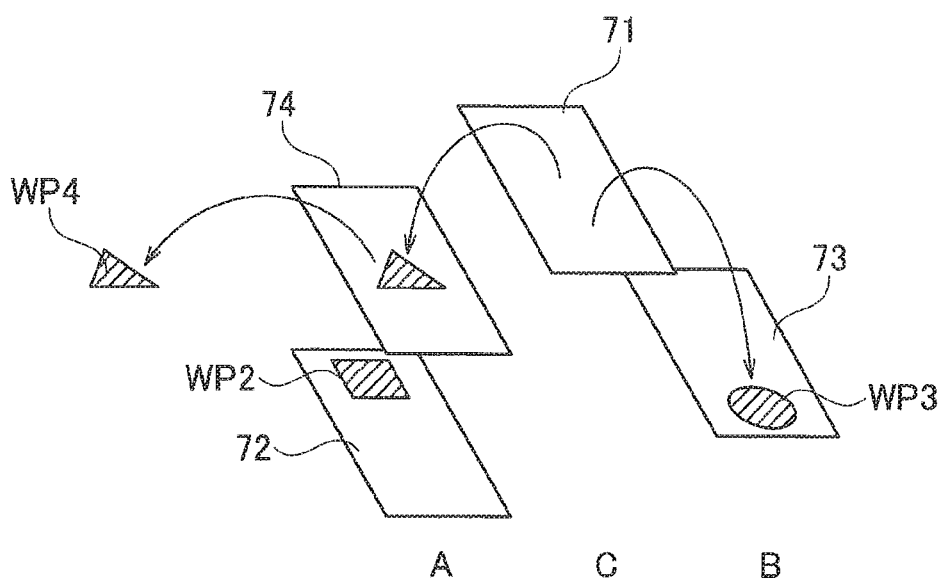
FIG. 12 is a fifth schematic view explaining the operation of the pallet moving device 52.

By the TK unit 53 (FIG. 2 and others), as illustrated in FIG. 12, the product WP4 on the product pallet 71 is transferred to the upper pallet 74 that is present in the front area A. The transferred product WP4 is properly carried by a worker or the like from the front area A to the outside. On the other hand, the product WP3 on the product pallet 71 is transferred to the middle pallet 73 that is in the rear area B.

Figure 13:
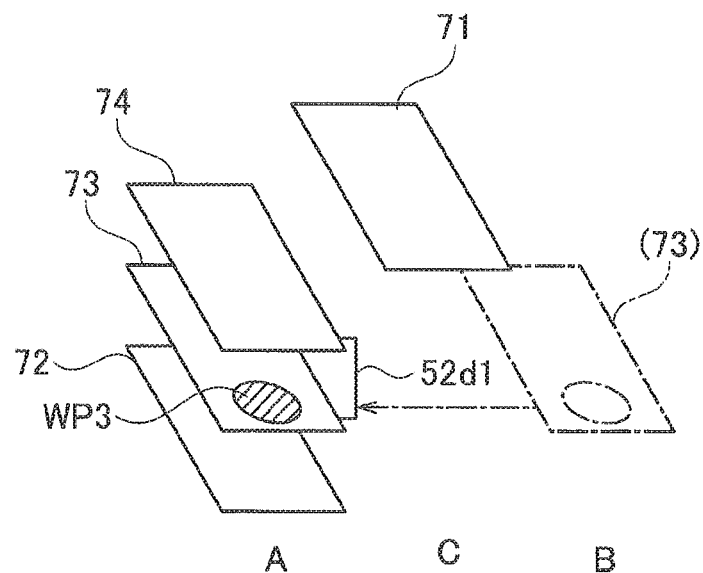
FIG. 13 is a sixth schematic view explaining the operation of the pallet moving device 52.
Figure 14:
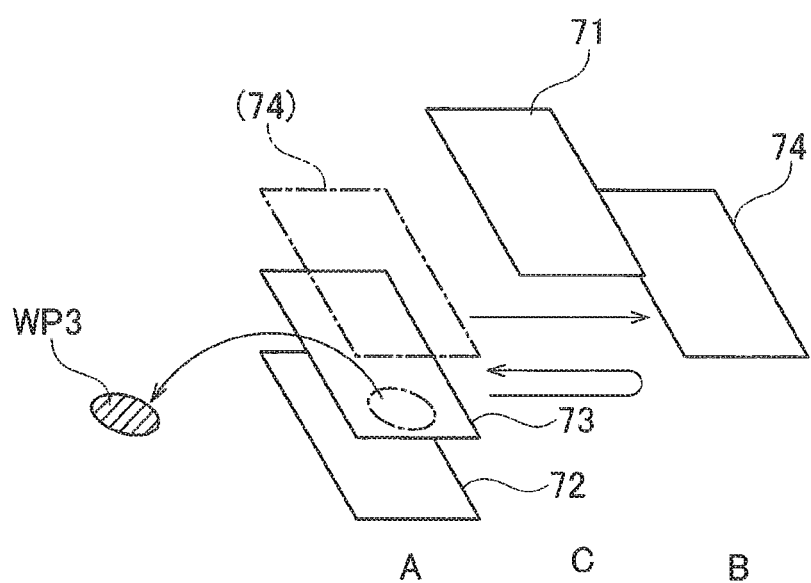
FIG. 14 is a seventh schematic view explaining the operation of the pallet moving device 52.

As illustrated in FIG. 13, the middle pallet 73 is moved to the front area A and the cart link part 52d (FIG. 1) is activated to connect the middle cart 75 and upper cart 76 with each other with the connection pin 52d1. Further, as illustrated in FIG. 14, the middle pallet 73 is moved together with the upper pallet 74 to the rear area B and the connection is released to move only the middle pallet 73 to the front area A (a folded arrow). And, a worker or a robot carries the product WP3 on the middle pallet 73 to the outside. Thereafter, the middle pallet 73 is returned to the rear area B to establish the operation initial state.

In this way, the sorting apparatus 51 achieves the movements of the upper pallet 74 by raising the pallet station 1 to the raised position and using the self-movable middle cart 75, thereby realizing the sorting of products WP to the three-stage pallets. Also, it is possible to carry the products WP (product collections WPT) placed on the three pallets (floor, middle, and upper) from a single area, i.e., the front area A to the outside.

With this, an installation space of the sorting apparatus 51 is reduced to the center area C corresponding to an installation area of the pallet station 11, the rear area B that is a transfer space for one pallet, and the front area A that is a carrying-out area. With these three spaces, sorting and carrying-out works are executable to save spaces.

Also, although there are the three pallets for sorting and collecting, all of the products WP collected on the three pallets can be carried out from the front area A, and therefore, a carrying-out work space is also saved.

Absolute positions of the middle cart 75 and upper cart 76 are grasped by the cart position management part 54b in the control device 54 according to detected information sent from sensors or encoders (not illustrated) of the cart drive part 52c.

The cart position management part 54b supplies from time to time information about the grasped cart absolute positions as cart position information to the cart operation control part 54c and TK unit operation control part 54d. The cart operation control part 54c and TK unit operation control part 54d control, according to the supplied cart position information, the operation of the middle cart 75, the connection and lock operation at the cart link part 52d and cart lock part 52e, and the operation of the TK unit.

Embodiment 2

The sorting apparatus 151 of the Embodiment 2 will be explained with reference to FIGS. 15 to 18. Many configurations of the sorting apparatus 151 is the same as those of the sorting apparatus 51 of the Embodiment 1, and therefore, different parts will mainly be explained. Also, reference numerals for common parts are, in principle, formed by adding 100 to those of the sorting apparatus 51. Further, the middle cart driving configuration and the middle cart and upper cart connecting configuration of the Embodiment 1 explained with reference to FIG. 5 are common to those of the Embodiment 2.

Figure 15:
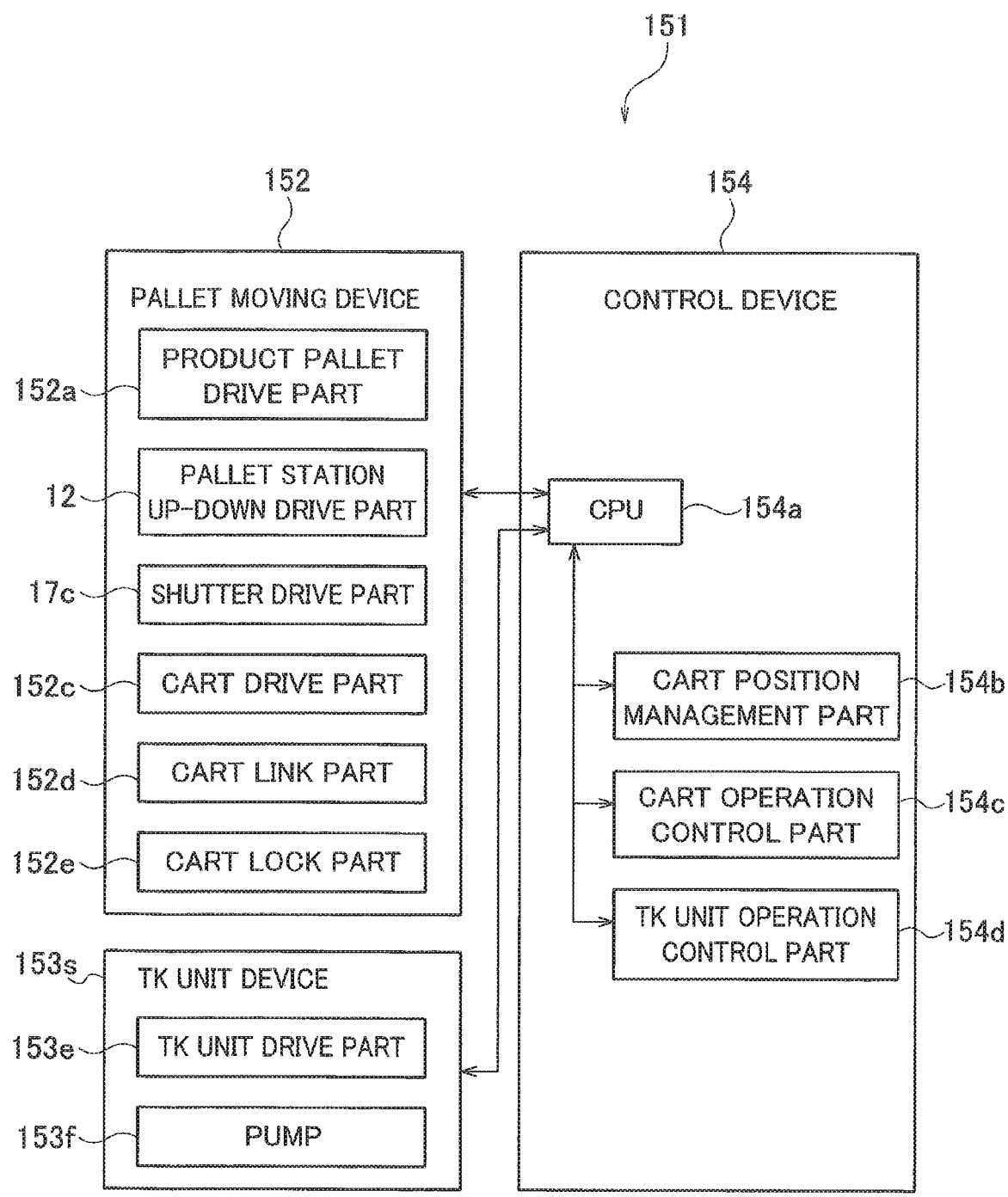
FIG. 15 is a block diagram illustrating a configuration of a sorting apparatus 151 that is Embodiment 2 of the product sorting apparatus according to an implementing mode of the present invention.

FIG. 15 is a block diagram illustrating a configuration of the sorting apparatus 151 and corresponds to FIG. 1. Also, FIGS. 16 to 18 correspond to FIGS. 2 to 4, respectively.

The sorting apparatus 151 differs from the sorting apparatus 51 in the following points a) to c). a) The floor pallet 72 is not provided. Accordingly, pallets used for sorting are a middle pallet 173 and an upper pallet 174. b) Guide rails 13a are arranged in the center area C and rear area B and are not arranged in the front area A. Accordingly, a TK unit 153 in the sorting apparatus 151 moves between the center area C and the rear area B and does not enter the front area A. c) At a boundary position between the front area A and the center area C, a shutter device 17 is arranged. The shutter device 17 is set to an opened state when a middle cart 175 and an upper cart 176 are moved between the front area A and the center area C and to a closed state in the other situations.

An open/close operation of a shutter drive part 17c is controlled by a CPU 54a.

Figure 16:
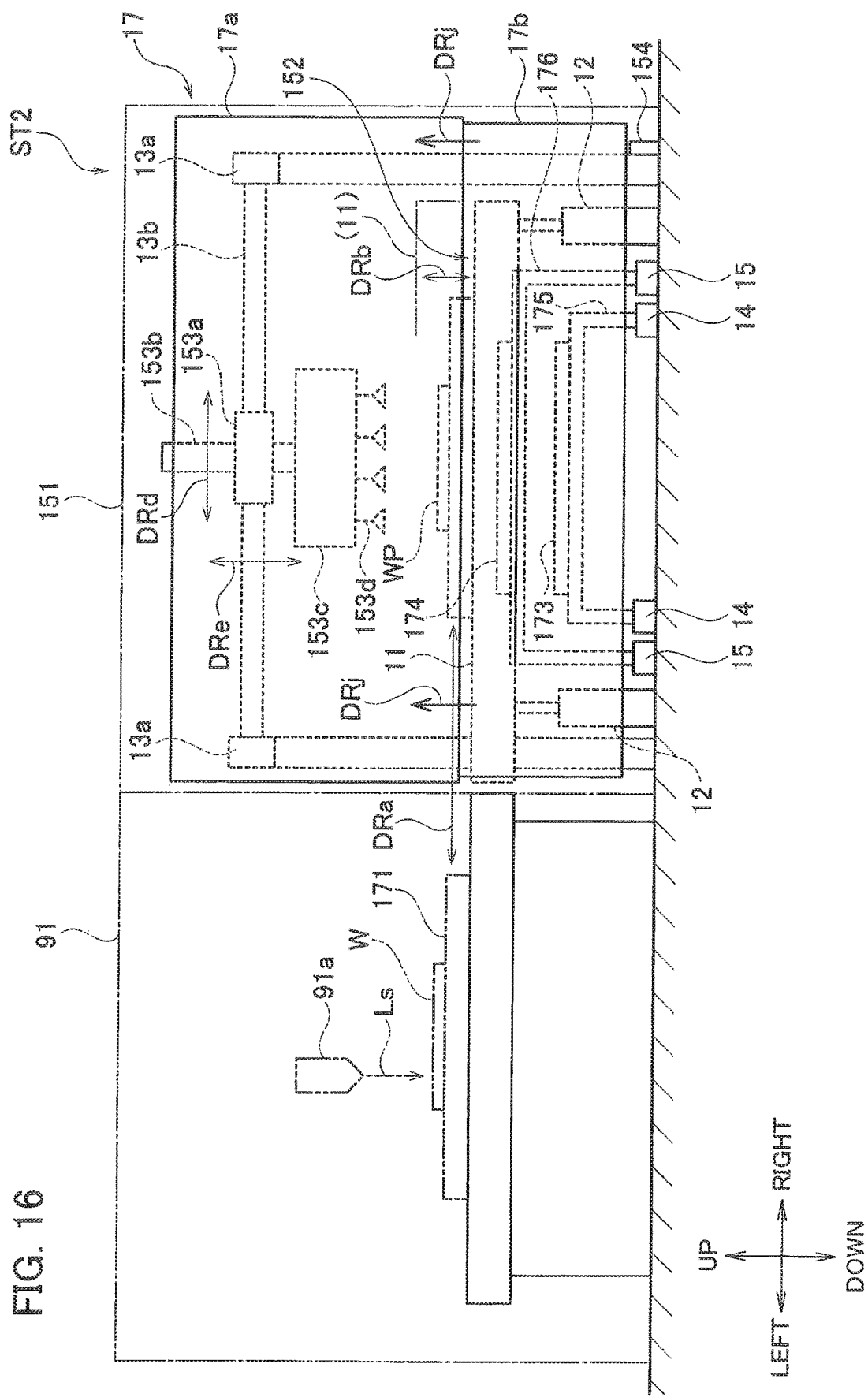
FIG. 16 is a front view illustrating a processing system ST2 including the sorting apparatus 151.
Figure 17:
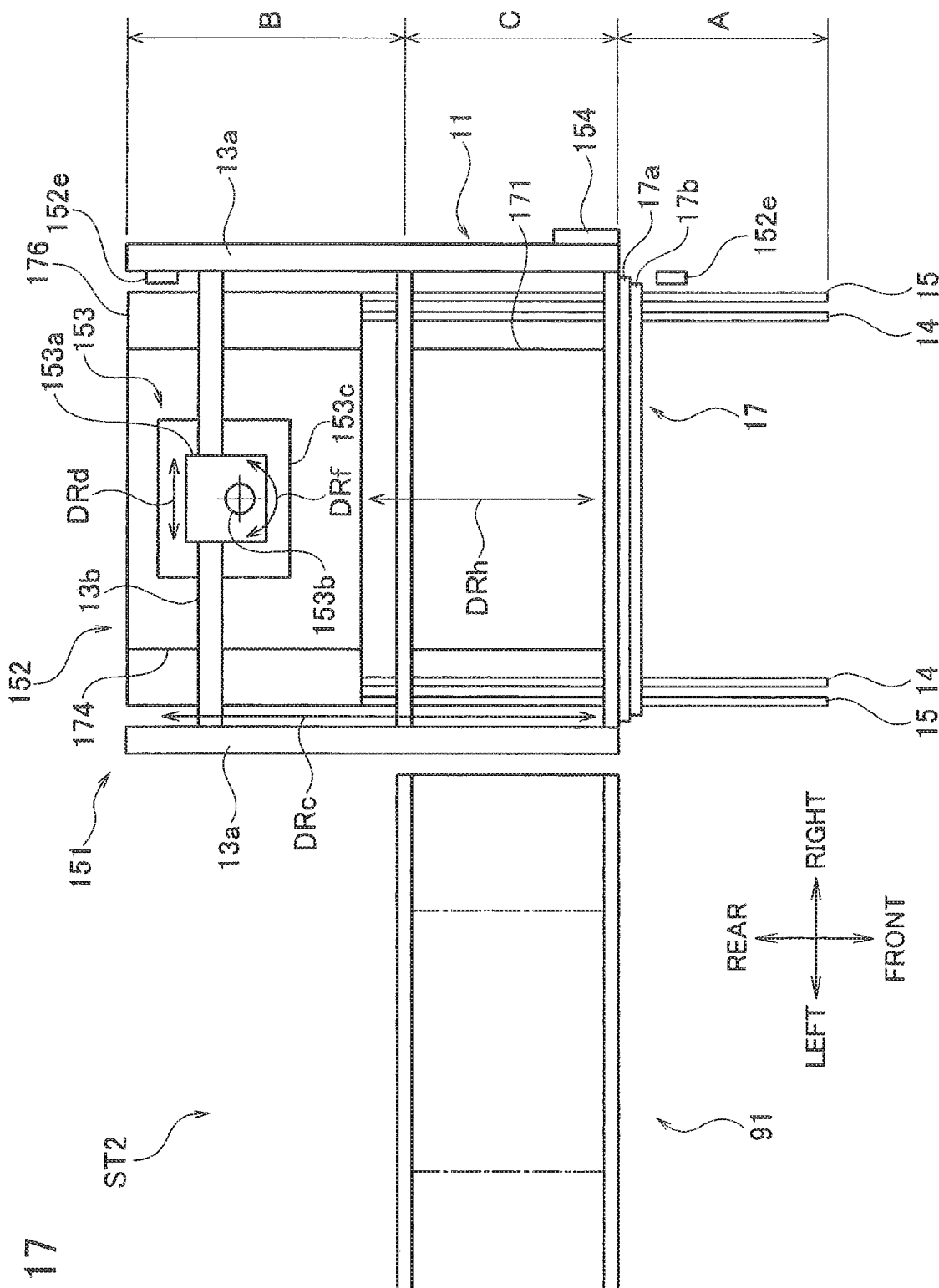
FIG. 17 is a top view of the processing system ST2.
Figure 18:
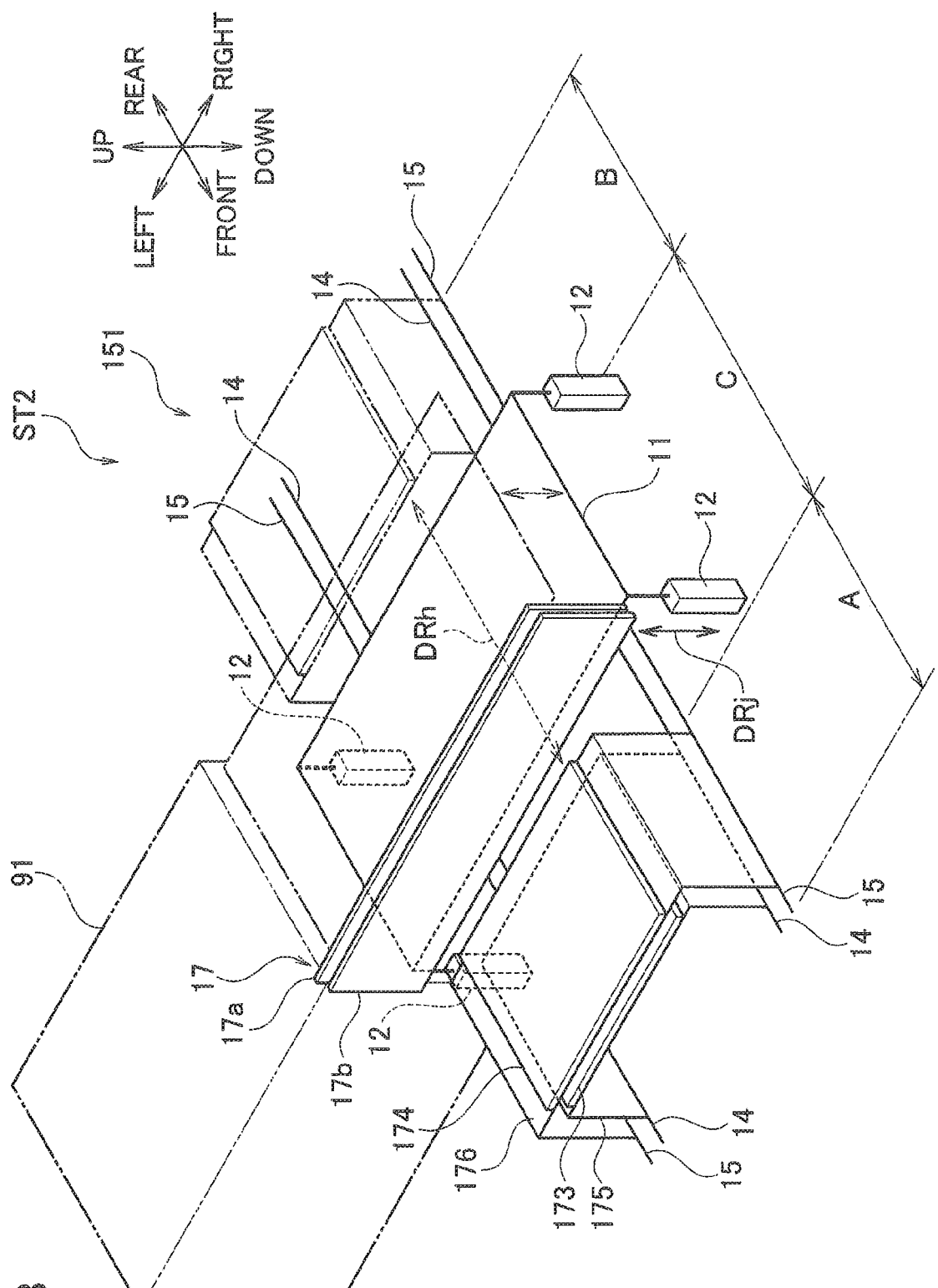
FIG. 18 is a perspective view of the processing system ST2.

First, this shutter device 17 will be explained. As illustrated in FIGS. 16 and 18, the shutter device 17 is arranged between the front area A and the center area C.

The shutter device 17 has a width substantially corresponding to a width of the sorting apparatus 151, and in a state of closure (closed state), shuts off with its width a range from a position close to the floor to a height exceeding a frame 13b.

The shutter device 17 is controlled to become the closed state at least while the processing system ST2 is in operation. This prevents the limbs of a worker mainly working in the front area A and materials and tools held by the hands of the worker from entering the center area C.

The shutter device 17 is halved into upper and lower halves. The upper half is a fixed shutter 17a and the lower half is a movable shutter 17b that is lifted along the fixed shutter 17a by the shutter drive part 17c. Main parts of the fixed shutter 17a and movable shutter 17b are formed from a transparent material so that an inner state is visible and graspable from the outside. When the shutter drive part 17c lifts the movable shutter 17b, there is formed an opening through which the upper cart 76, the upper pallet 74 placed thereon, and a product collection WPT placed thereon are movable back and forth.

Figure 19:
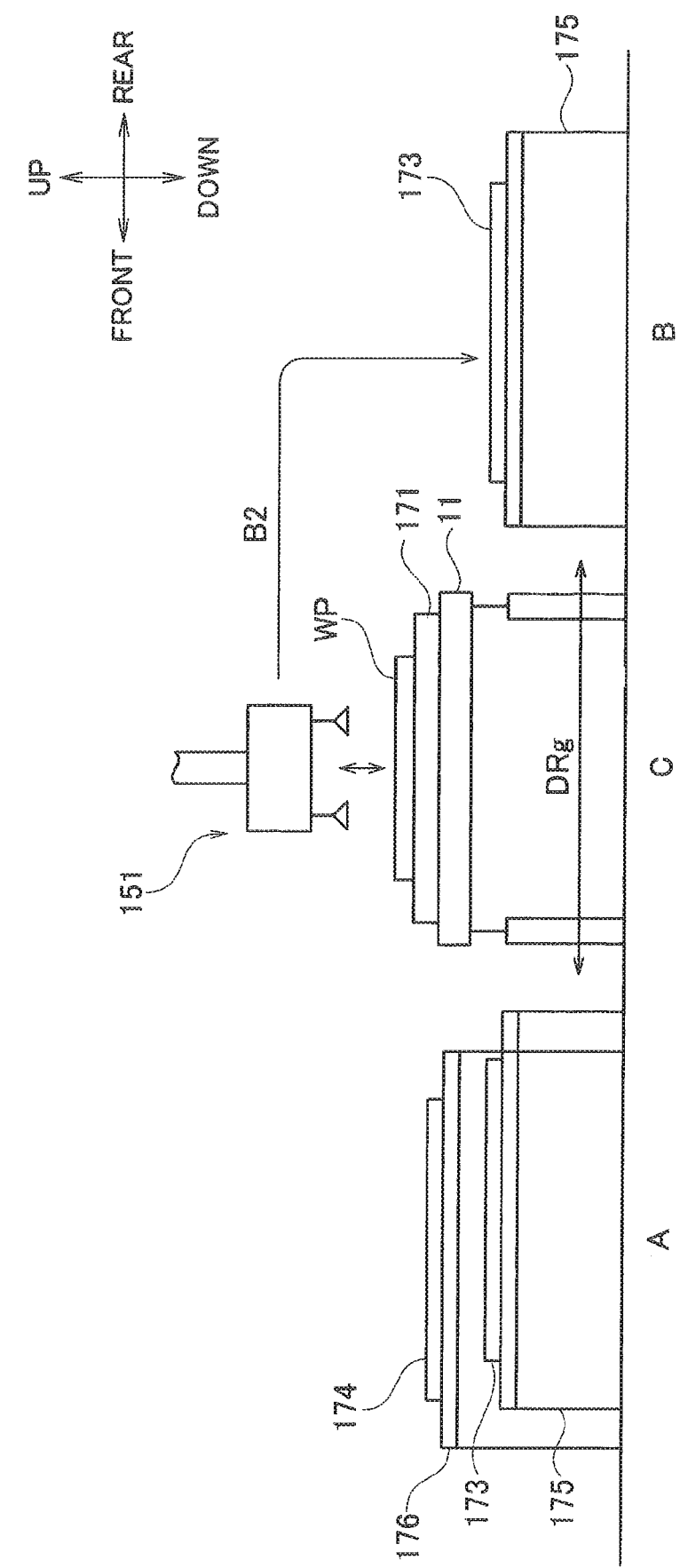
FIG. 19 is a schematic view explaining a product transfer path when a pallet station 11 of the sorting apparatus 151 is at a base position.

With the configuration having the above-mentioned shutter device 17, the pallet moving device 152 is able to move, when the pallet station 11 is at the base position and the upper cart 176 is in the front area A as illustrated in FIG. 19, the middle cart 175 under the pallet station 11 to the rear area B (naturally, the opposite to this is also possible).

And, to the middle pallet 173 placed on the middle cart 175 moved to the rear area B, the TK unit 153 is able to transfer a product WP along a transfer path B2.

Figure 20:
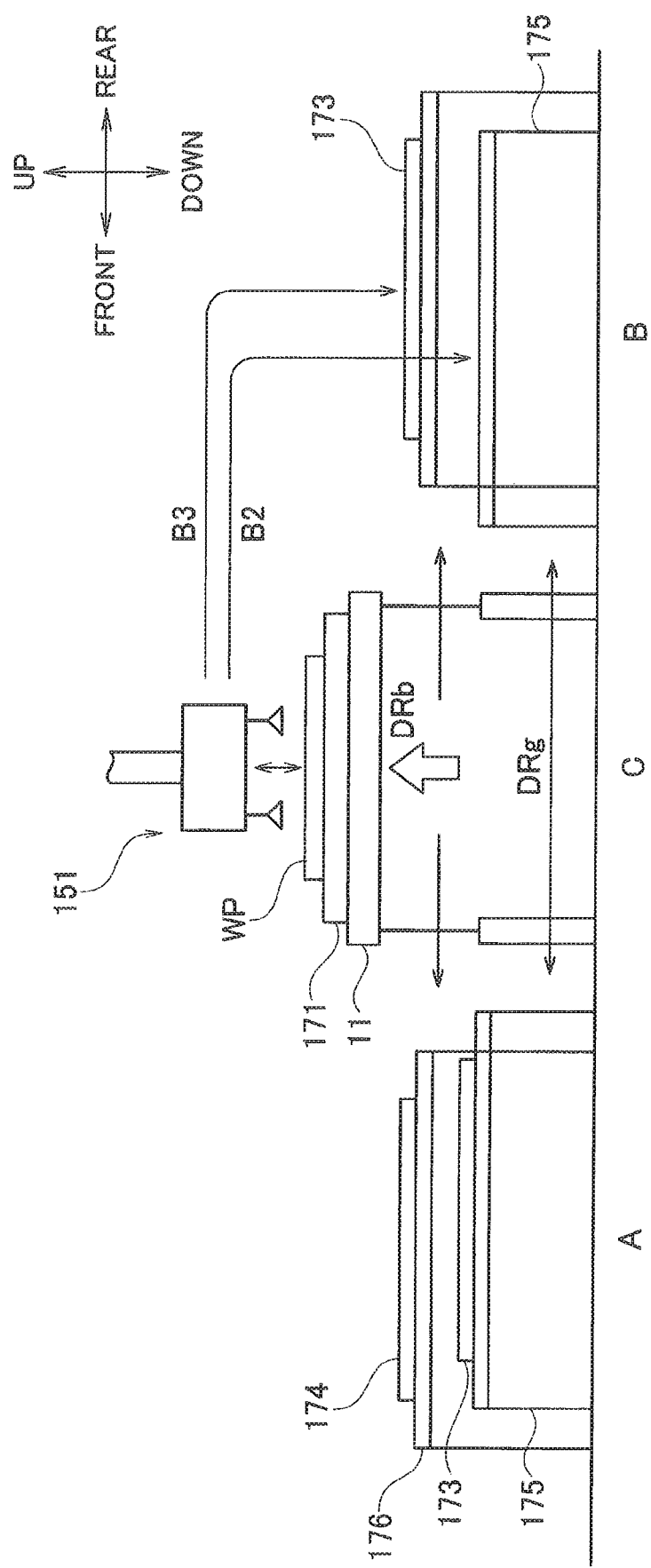
FIG. 20 is a schematic view explaining product transfer paths when the pallet station 11 is at a raised position.

Also, as illustrated in FIG. 20, the pallet moving device 152 is able to move, when the pallet station 1 is at the raised position, the upper cart 176 accompanied by the middle cart 175 between the front area A and the rear area B.

Accordingly, to the upper pallet 174 moved to the rear area B, the TK unit 153 is able to transfer a product WP along a transfer path B3. Naturally, only the upper cart 176 may be positioned in the front area A so that the product WP is transferred through a transfer path B2 to the middle pallet 173 in the rear area B.

In this way, the sorting apparatus 151 is able to transfer, by the TK unit 153, the product WP on the product pallet 171 only to one area (the rear area B). However, it is possible to transfer the product WP to two pallets (the middle pallet 173 and upper pallet 174) whose number is greater than the number of the transferrable area (one).

Also, with respect to any one of the two pallets on which the products WP are placed, a worker or a robot is able to carry the products WP to the outside from a single area (the front area A).

Also, the sorting apparatus 151 is provided with the shutter device 17 and sets the shutter device 17 in the closed state at least during the carrying of the product WP from the front area A to the outside. The closed state of the shutter device 17 secures the safety of a worker with respect to the pallet moving device 152, to allow the laser processing machine 91 to be activated.

With this, even when the product WP is being carried from the front area A to the outside, the laser processing machine 91 can be operated and the product pallet 171 can safely be moved between the laser processing machine 91 and the pallet station 11. Naturally, the TK unit can also be operated.

Concrete examples of sorting and transferring products WP placed on the product pallet 171 to two pallets (the middle pallet 173 and upper pallet 174) will be explained with reference to FIGS. 21 to 29 that are schematic operational views illustrating only the pallets and shutter device 17. In each drawing, the products WP to be sorted are three kinds, i.e., a product WP3 (depicted as a circle) to be sorted to the middle pallet 173 and a product WP4 (depicted as a triangle) to be sorted to the upper pallet 174. Further, to avoid drawing complication, only the product pallet 171, pallet station 11, middle pallet 173, and upper pallet 174 are illustrated and the other members (the carts, the TK unit 153, and the like) are not illustrated. Operations of the respective drive devices are controlled by the control device 154.

Figure 21:
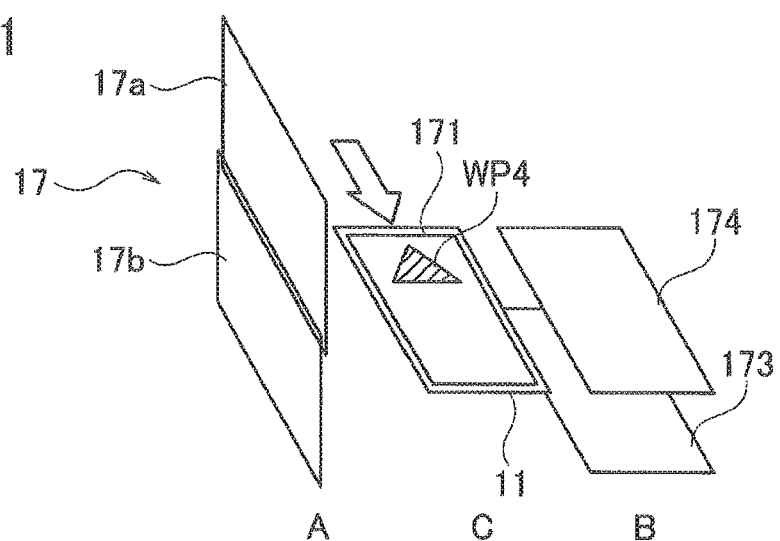
FIG. 21 is a first schematic view explaining the operation of a pallet moving device 152.
Figure 22:
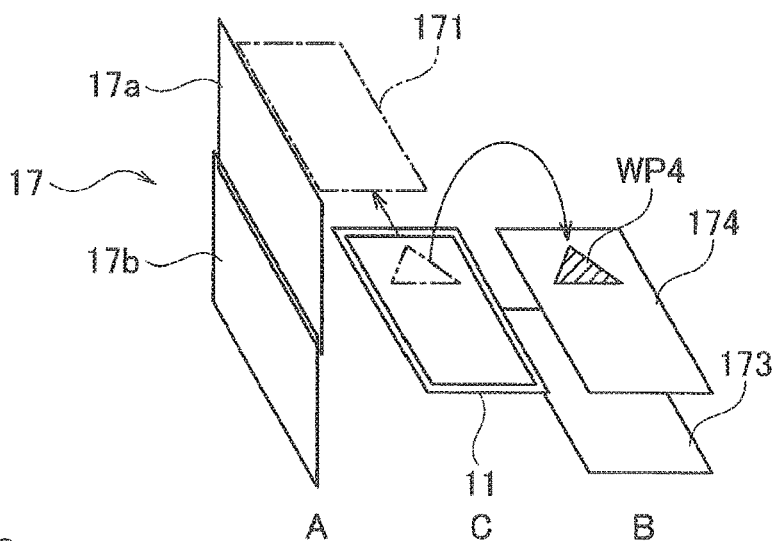
FIG. 22 is a second schematic view explaining the operation of the pallet moving device 152.
Figure 23:
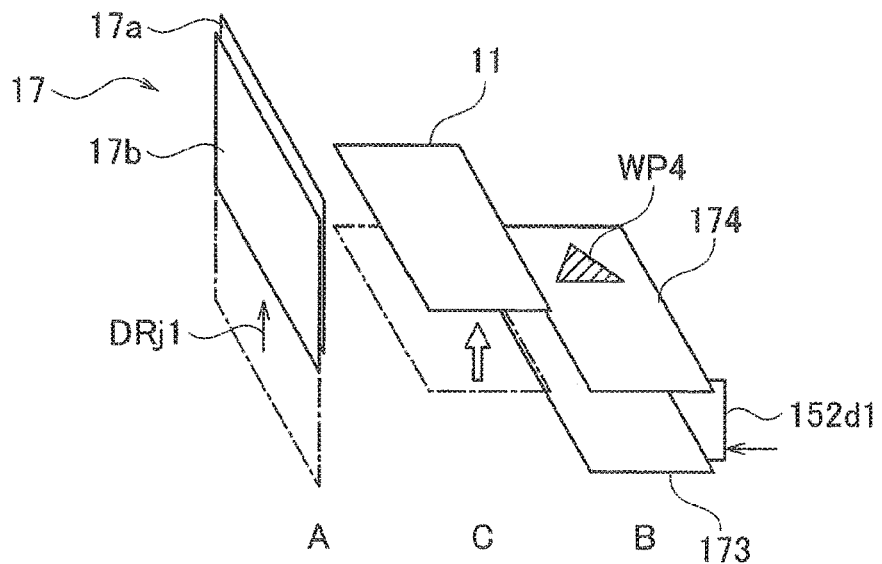
FIG. 23 is a third schematic view explaining the operation of the pallet moving device 152.

FIG. 21 illustrates an operation initial state of the pallet moving device 152. Namely, it is a state that the middle pallet 173 and upper pallet 174 are positioned in the rear area B, the pallet station 11 is positioned at the base position, and the shutter device 17 is closed.

FIG. 21 illustrates a state that, to the pallet station 11, the product pallet 171 on which the product WP4, which has been cut by the laser processing machine 91, is conveyed from the laser processing machine 91 (a white arrow).

The product WP4 on the product pallet 171 in the pallet station 11 is transferred by the TK unit 153 (not illustrated) to the upper pallet 174. Thereafter, the vacant product pallet 171 is returned from the pallet station 11 to the laser processing machine 91.

The pallet station 11 is raised by the pallet station up-down drive part 12 to the raised position (refer to a white arrow in FIG. 23), so that the upper cart 176 and upper pallet 174 can pass to the front area A. Also, the shutter device 17 is brought to the opened position (refer to an arrow DRg1).

Figure 24:
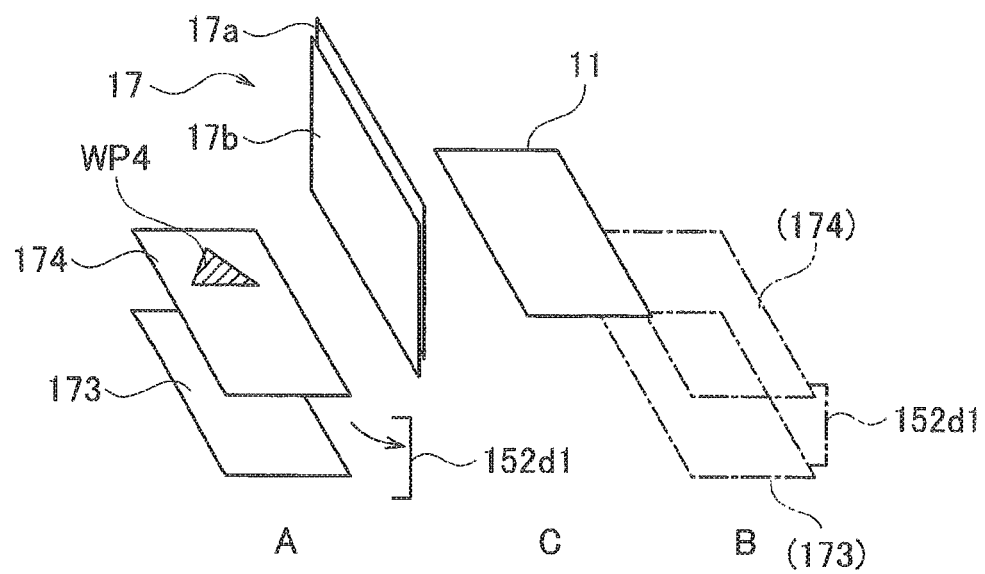
FIG. 24 is a fourth schematic view explaining the operation of the pallet moving device 152.

As illustrated in FIG. 24, a cart link part 152d is activated to connect the middle cart 175 and upper cart 176 to each other with a connection pin 152d1, a cart drive part 152c is activated to move them to the front area A, and the connection is released.

Figure 25:
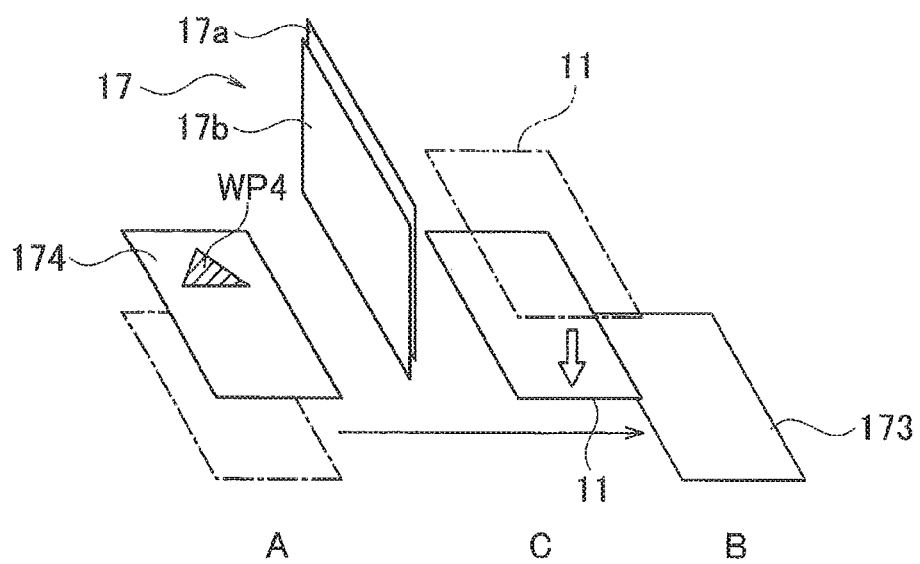
FIG. 25 is a fifth schematic view explaining the operation of the pallet moving device 152.

As illustrated in FIG. 25, the cart drive part 152c is activated to move only the middle cart 175 and middle pallet 172 to the rear area B and the pallet station up-down drive part 2 is activated to lower the pallet station 11 to the base position (refer to a white arrow).

Figure 26:
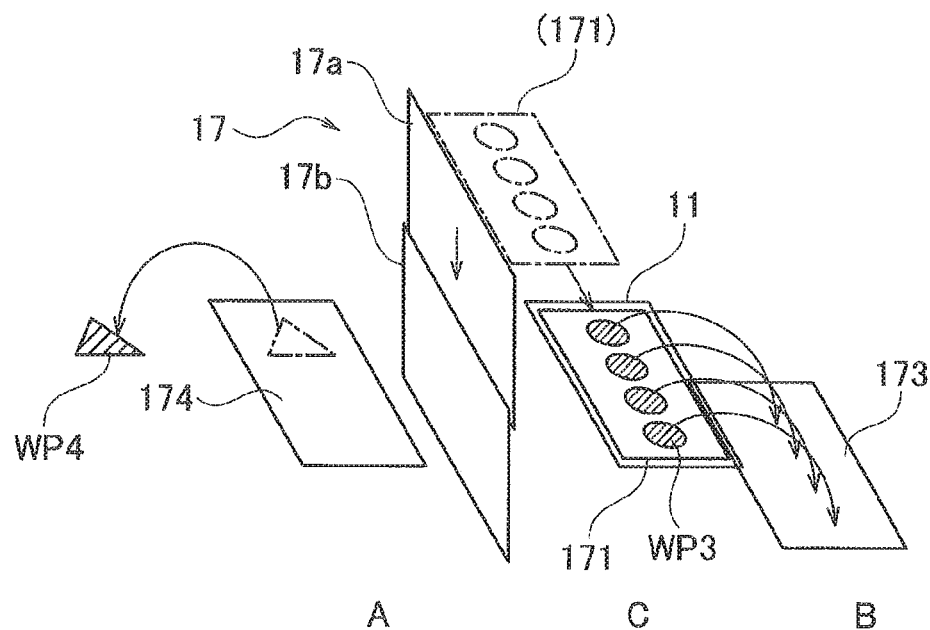
FIG. 26 is a sixth schematic view explaining the operation of the pallet moving device 152.

As illustrated in FIG. 26, the shutter device 17 is brought to the closed state to secure the safety of a worker and the product WP4 on the middle pallet 174 in the front area A is carried by the worker (or a robot) to the outside.

On the other hand, when the shutter device 17 is in the closed state, the laser processing machine 91 is able to carry out a processing operation as already mentioned and the product WP3 cut from a raw material by this processing is placed on the product pallet 171, which is conveyed to the pallet station 11. The TK unit 153 (not illustrated) transfers the product WP3 to the middle pallet 173 that is present in the rear area B.

Figure 27:
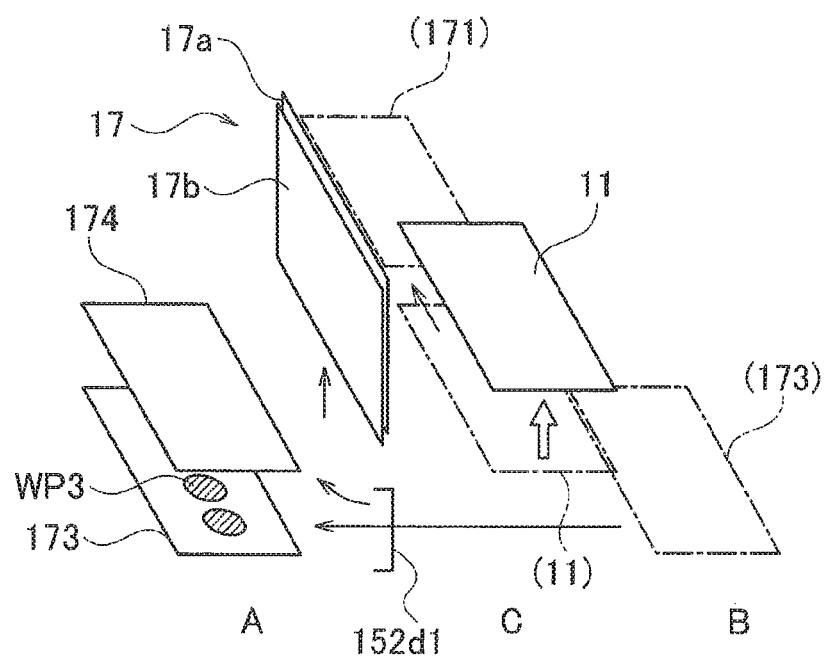
FIG. 27 is a seventh schematic view explaining the operation of the pallet moving device 152.

In FIG. 27, the pallet station up-down drive part 2 is activated to lift the pallet station 11 to the raised position (refer to a white arrow) and the shutter device 17 is brought to the opened state.

And, the cart drive part 152c is operated to move the middle cart 175 and middle pallet 173 to the front area A and the middle cart 175 is connected with the connection pin 152d1 to the upper cart 176 which is in the front area A and on which the vacant upper pallet 174 is placed.

Figure 28:
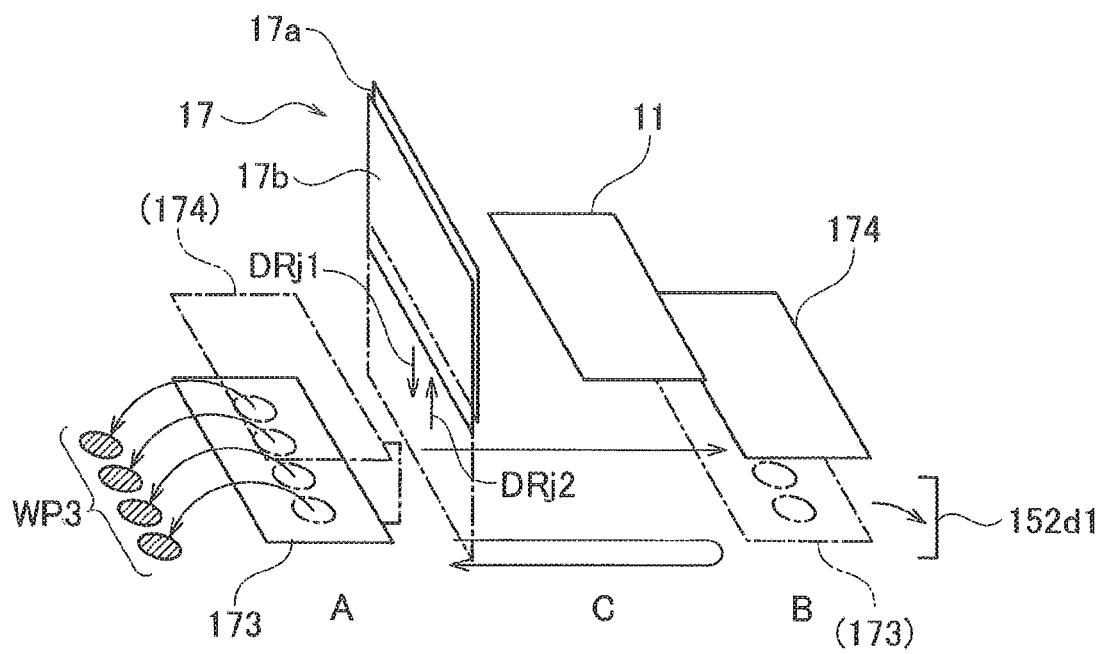
FIG. 28 is an eighth schematic view explaining the operation of the pallet moving device 152.

As illustrated in FIG. 28, the cart drive part 152c is operated to move the middle cart 175 and upper cart 176 to the rear area B, the connection pin 152d1 is retracted, and the middle pallet 173 on which the product WP3 is placed and the middle cart 175 are moved to the front area A.

And, the shutter device 17 is brought to the closed state (refer to an arrow DRj1) and the product WP3 placed on the middle pallet 173 is carried by a worker or a robot to the outside.

Figure 29:
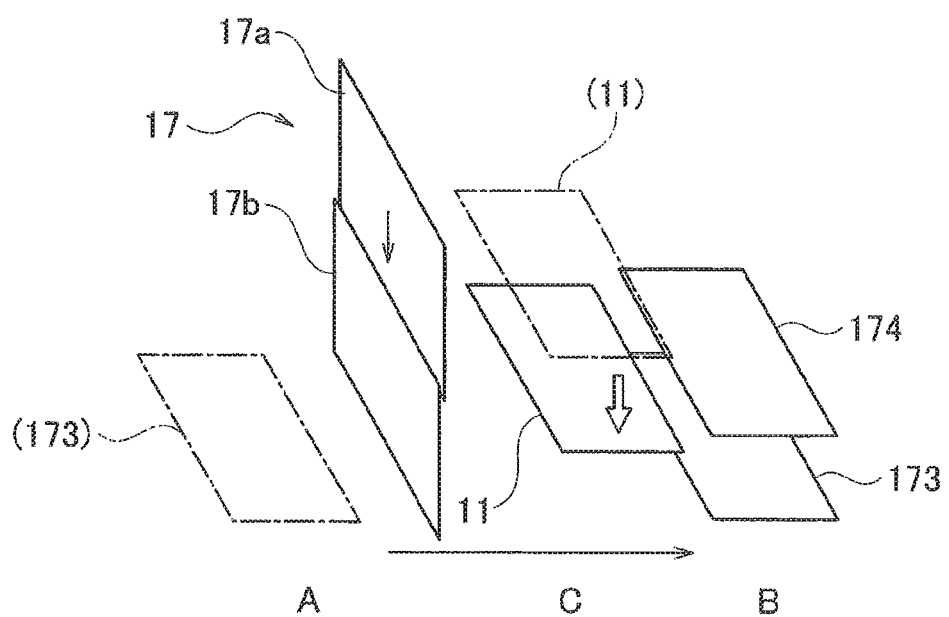
FIG. 29 is a ninth schematic view explaining the operation of the pallet moving device 152.

After the product WP3 is carried, the operation initial state is established. Namely, the shutter device 17 is brought to the opened state (refer to an arrow DRj2 in FIG. 28), and as illustrated in FIG. 29, the middle cart 175 on which the middle pallet 173 is placed is moved to the rear area B and the shutter device 17 is again brought to the closed state. Also, the pallet station 11 is lowered to the base position.

In this way, the sorting apparatus 151 moves the upper pallet 74 when the pallet station 11 is at the raised position and the shutter device 17 is in the opened state by using the self-movable middle cart 175, thereby sorting the products WP to the pallets in two stages. Further, the products WP (product collections WPT) placed on the two pallets (middle and upper) can all be carried from a single area, i.e., the front area A to the outside.

With this, the installation space of the sorting apparatus 151 is saved to the center area C in which the pallet station 11 is installed and the rear area B and front area A that are a one-pallet transferring space and a one-pallet carrying-out space, respectively, capable of sorting and transferring products to two pallets.

Also, even provided with the two pallets for sorting and collecting, all of the products WP collected on the two pallets can be carried from the front area A, and therefore, an area for the carrying-out work is also saved.

Absolute positions of the middle cart 175 and upper cart 176 are grasped, according to detected information sent from sensors or encoders of the cart drive part 152c (not illustrated), by a cart position management part 154b in the control device 154.

The cart position management part 154b supplies from time to time the grasped cart absolute position information as cart position information to a cart operation control part 54c and TK unit operation control part 154d. According to the supplied cart position information, the cart operation control part 154c and TK unit operation control part 154d control the operation of the middle cart 175, the connection and lock operation of the cart link part 152d and cart lock part 152e, and the operation of the TK unit 153.

Embodiments of the present invention are not limited by the above-mentioned configurations and sequences and are modifiable without departing from the gist of the present invention.

Objects to be sorted are not limited to the products WP. They may be raw materials, intermediate members in the middle of processing, or any other so-called goods. Accordingly, a device on the upstream side of the pallet moving device 52 or 152 is not limited to the laser processing machine 91. It maybe a processing machine such as a punching processing machine or a storage shelf such as a product stocker that achieves no processing.

The number of stages of back-and-forth movable carts (pallets) is not limited to two (middle and upper) as explained in the embodiments. It may be three or more. Further, the cart drive part 52c may be provided for each cart to make the cart self-movable. However, in view of suppressing the installation space and cost of the cart drive part 52c, a preferable configuration is that, as explained in the Embodiments 1 and 2, the cart drive part 52c is provided for one cart and this cart accompanies another cart with the use of the link device.

The Embodiment 1 and Embodiment 2 can be combined together within a possible range. Namely, in the sorting apparatus 51 of the Embodiment 1, the shutter apparatus 17 explained in the Embodiment 2 is installed between the front area A and the center area C. And, when the middle cart 75, upper cart 76, and TK unit 53 are moved between the front area A and the center area C, the shutter device 17 is opened, and when products are carried from the front area A to the outside, the shutter device 17 is closed. In the state that the shutter device 17 is closed, the TK unit 53 can be controlled, like the TK unit 153 of the Embodiment 2, to move between the center area C and the rear area B to sort and transfer products.

Also, the cart lock parts 52e and 152e to lock the upper carts 76 and 176 and the like may be arranged in the center area C to stop and keep the upper carts 76 and 176 in the center area C.

With this, for example, when retracting the upper carts 76 and 176 from the front area A, they may not be moved up to the rear area B but they may be retracted to and kept at the center area C with a shorter movement, thereby improving a cart moving efficiency.

Further, the moving sequences of each cart are not limited to the above-mentioned sequences. For example, in the Embodiment 1, a position where the upper cart 76 that is not self-movable is usually positioned may be the rear area B and a position where the middle cart 75 is usually positioned may be the center area C, so that, without firstly moving the carts, products can be transferred from the product pallet 71 to both the floor pallet 72 and upper pallet 74.

As mentioned in the above-mentioned Embodiments 1 and 2, the front area A functions as a carrying-out area from which goods (including pallets) can be carried outside. More precisely, goods (products WP3 and product collections WPT) placed on the middle pallets 73 and 173 supported by the middle carts 75 and 175 can be carried out to the outside when the middle carts 75 and 175 and upper carts 76 and 176 are in the area A. Naturally, if the middle pallets 73 and 173 and the upper pallets 74 and 174 can be carried by a forklift or the like, each pallet itself can be carried to the outside.

In this case, a carrying-out work space into and out of which a carrying-out worker or forklift moves is not required for the rear area B that is on the depth side of the pallet station 1 or 11 (the backside of the processing system ST1 or ST2). It is sufficient if the space is secured on the adjacent front side of the front area A (the front side of the processing system ST1 or ST2). This saves a space and improves the convenience of a carrying-out work.

Configurations of the control devices 54 and 154 are not limited to the above-mentioned ones. For example, in the control device 54, at least one of the cart position management part 54b, cart operation control part 54c, and TK unit operation control part 54d may be prepared inside the central processing unit (CPU) 54a. This is the same for the control device 154.

According to the present invention, there is provided an effect of saving an installation space and a space for a carrying-out work, thereby improving the convenience of the carrying-out work.

UNITED STATES DESIGNATION

In connection with United States designation, this international patent application claims the benefit of priority under 35 U.S.C. 119(a) to Japanese Patent Application No. 2017-216140 filed on Nov. 9, 2017 whose disclosed contents are incorporated herein by reference.

The invention claimed is:

1. A product sorting apparatus comprising:
   a pallet station supporting a pallet on which a product is placed and moving up and down between a base position and a raised position higher than thy: base position;
   a transfer device being able to transfer the product, which is placed on the pallet supported by the pallet station, to a first area that is on a first side of the pallet station;
   a first cart movable between the first area and a second area that is on a second side of the pallet station; and
   a second cart movable between the first area and the second area and is able to pass through the inside of the first cart, wherein:
   through the inside of the pallet station set at the base position, the first cart is unable to pass and the second cart is able to pass; and through the inside of the pallet station set at the raised position, both the first and second carts are able to pass.

2. The product sorting apparatus as set forth in claim 1 characterized in that the transfer device is able to move the product to the second area.

3. The product sorting apparatus as set forth in claim 1, characterized by comprising a shutter device between the pallet station and the second area.

4. The product sorting apparatus as set forth in claim 1, characterized in that at least one of the first cart and second cart is self-movable and that a cart link part is provided to selectively execute connection and disconnection between the first cart and the second cart.

5. The product sorting apparatus as set forth in claim 1, characterized in that the second area is a carrying-out area from which the product is carried to the outside.

* * * * *

UNITED STATES PATENT AND TRADEMARK OFFICE
CERTIFICATE OF CORRECTION

PATENT NO. : 10,981,733 B2
APPLICATION NO. : 16/761347
DATED : April 20, 2021
INVENTOR(S) : T. Ichikawa It is certified that error appears in the above-identified patent and that said Letters Patent is hereby corrected as shown below:

In the Claims

Column 12, Line 55, Claim 1, Line 4, please change "thy:" to --the--

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*